US012531673B2

(12) United States Patent
Lou et al.

(10) Patent No.: US 12,531,673 B2
(45) Date of Patent: Jan. 20, 2026

(54) SYSTEMS AND METHODS FOR COLLISION RESOLUTION IN A WIFI OFDMA SYSTEM

(71) Applicant: INTERDIGITAL PATENT HOLDINGS, INC., Wilmington, DE (US)

(72) Inventors: Hanqing Lou, Syosset, NY (US); Alphan Sahin, Westbury, NY (US); Li-Hsiang Sun, San Diego, CA (US); Xiaofei Wang, North Caldwell, NJ (US); Rui Yang, Greenlawn, NY (US); Frank La Sita, Setauket, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 338 days.

(21) Appl. No.: 17/608,789

(22) PCT Filed: May 4, 2020

(86) PCT No.: PCT/US2020/031301
§ 371 (c)(1),
(2) Date: Nov. 4, 2021

(87) PCT Pub. No.: WO2020/231661
PCT Pub. Date: Nov. 19, 2020

(65) Prior Publication Data
US 2022/0330344 A1    Oct. 13, 2022

Related U.S. Application Data

(60) Provisional application No. 62/971,635, filed on Feb. 7, 2020, provisional application No. 62/846,202, filed on May 10, 2019.

(51) Int. Cl.
*H04W 74/08* (2024.01)
*H04L 1/18* (2023.01)
(Continued)

(52) U.S. Cl.
CPC .......... *H04L 1/1893* (2013.01); *H04L 1/1896* (2013.01); *H04L 5/0007* (2013.01); *H04L 5/0055* (2013.01); *H04L 27/2602* (2013.01)

(58) Field of Classification Search
CPC . H04L 1/1893; H04L 1/1896; H04L 27/2602; H04L 5/0007; H04L 5/0053; H04L 5/0055; H04W 74/0833
See application file for complete search history.

(56) References Cited

U.S. PATENT DOCUMENTS 9,912,514 B2    3/2018 Choi et al.
10,368,358 B2 *  7/2019 Adachi ................. H04L 5/0007
(Continued)

FOREIGN PATENT DOCUMENTS

| CN | 107645737 A | 1/2018 |
| CN | 109586889 | 10/2021 |
| EP | 3 038 424 | 6/2016 |

OTHER PUBLICATIONS

Cariou, "802.11 EHT Proposed PAR," IEEE P802.11 Wireless LANs, IEEE 802.11-18/1231r4 (Jan. 2019).
(Continued)

*Primary Examiner* — Liton Miah
(74) *Attorney, Agent, or Firm* — Volpe Koenig

(57) ABSTRACT

Methods and system may be used for collision detection for orthogonal frequency division multiple access (OFDMA)-based random access. A wireless transmit/receive unit (WTRU) may receive, from an access point (AP), a first trigger frame triggering random access using OFDMA. The WTRU may transmit, to the AP, in response to the first trigger frame a trigger-based frame including user specific control information in a signal (SIG) field. The WTRU may receive an acknowledgment/negative acknowledgment (ACK/NAK) message indicating that the trigger-based frame was successfully detected at the AP or that the
(Continued)

trigger-based frame was not successfully detected at the AP. The WTRU receive, from the AP, a scheduling retransmission frame including rescheduling information for STAs with corrupted UL transmissions. On a condition that the scheduling retransmission frame indicates that a collision of the trigger-based frame was detected, the WTRU may retransmit the trigger-based frame.

16 Claims, 9 Drawing Sheets

(51) Int. Cl.
*H04L 1/1867* (2023.01)
*H04L 5/00* (2006.01)
*H04L 27/26* (2006.01)

(56) References Cited

U.S. PATENT DOCUMENTS

| | | | |
|---|---|---|---|
| 10,440,751 B2 | 10/2019 | Kim et al. | |
| 10,477,576 B2 | 11/2019 | Lou et al. | |
| 10,575,314 B2 | 2/2020 | Park et al. | |
| 10,708,029 B2 | 7/2020 | Li et al. | |
| 10,764,921 B2* | 9/2020 | Park | H04W 74/002 |
| 11,265,832 B2 | 3/2022 | Yu et al. | |
| 2015/0063340 A1 | 3/2015 | Cai et al. | |
| 2016/0183305 A1* | 6/2016 | Huang | H04W 74/0833 370/329 |
| 2017/0079071 A1 | 3/2017 | Zhou et al. | |
| 2017/0359812 A1 | 12/2017 | Park et al. | |
| 2018/0092032 A1 | 3/2018 | Choi et al. | |
| 2018/0184425 A1 | 6/2018 | Ghosh et al. | |
| 2019/0313466 A1 | 10/2019 | Ko et al. | |
| 2020/0128584 A1* | 4/2020 | Adachi | H04W 74/0816 |

OTHER PUBLICATIONS

Cariou, "IEEE 802.11 EHT draft Proposed CSD," IEEE P802.11 Wireless LANs, IEEE 802.11-18/1233r4 (Jan. 2019).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D4.1 (Apr. 2019).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D6.0 (Nov. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Kishida et al., "Views on Latency and Jitter Features in TGbe," IEEE 802.11-19/1207r4 (Aug. 1, 2019).
Sakoda et al., "Low latency streaming capability for game applications," IEEE 802.11-19/430r0 (Mar. 12, 2019).

* cited by examiner

SYSTEMS AND METHODS FOR COLLISION RESOLUTION IN A WIFI OFDMA SYSTEM

CROSS-REFERENCE TO RELATED APPLICATIONS

This application is the U.S. National Stage, under 35 U.S.C. § 371, of International Application No. PCT/US2020/031301 filed May 4, 2020, which claims the benefit of U.S. Provisional Application No. 62/846,202, filed May 10, 2019, and U.S. Provisional Application No. 62/971,635, filed Feb. 7, 2020, the contents of which are incorporated herein by reference.

BACKGROUND

The IEEE 802.11™ Extremely High Throughput (EHT) wireless local area network (WLAN) Study Group (SG) was created to explore the scope and purpose of a possible, future amendment to provide enhanced throughput, enhanced reliability, reduced latency and jitter and improved power efficiency in many usage scenarios. The IEEE Standard board approved the IEEE 802.11be Task Group (TG) based on a Project Authorization Request (PAR) and Criteria for Standards Development (CSD) developed in the EHT SG. The new generation WLAN devices are expected provide support to applications that require very low latency in addition to support require high throughput and high spectral efficiency. Example applications that are targeted to be supported by next generation WLAN, such as 802.11be, and requiring low-latency communications may include, but are not limited to include, 4K/8K video, gaming, virtual and augmented reality, remote office, and/or cloud computing. In 802.11be PAR, latency is mentioned as one of the requirements because high-throughput, low latency applications will proliferate such as virtual reality or augmented reality, gaming, remote office and/or cloud computing.

SUMMARY

Methods and system may be used for collision detection for orthogonal frequency division multiple access (OFDMA)-based random access. A wireless transmit/receive unit (WTRU) may receive, from an access point (AP), a first trigger frame triggering random access using OFDMA. The WTRU may transmit, to the AP, in response to the first trigger frame a trigger-based frame including user specific control information in a signal (SIG) field. The WTRU may receive an acknowledgment/negative acknowledgment (ACK/NAK) message indicating that the trigger-based frame was successfully detected at the AP or that the trigger-based frame was not successfully detected at the AP. The WTRU receive, from the AP, a scheduling retransmission frame including rescheduling information for STAs with corrupted UL transmissions. On a condition that the scheduling retransmission frame indicates that a collision of the trigger-based frame was detected, the WTRU may retransmit the trigger-based frame. The WTRU may transmit the SIG field using a portion of a bandwidth, such as a partial resource unit (RU), and may transmit at least one field of the trigger-based frame, other than the SIG field, using the entire bandwidth.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
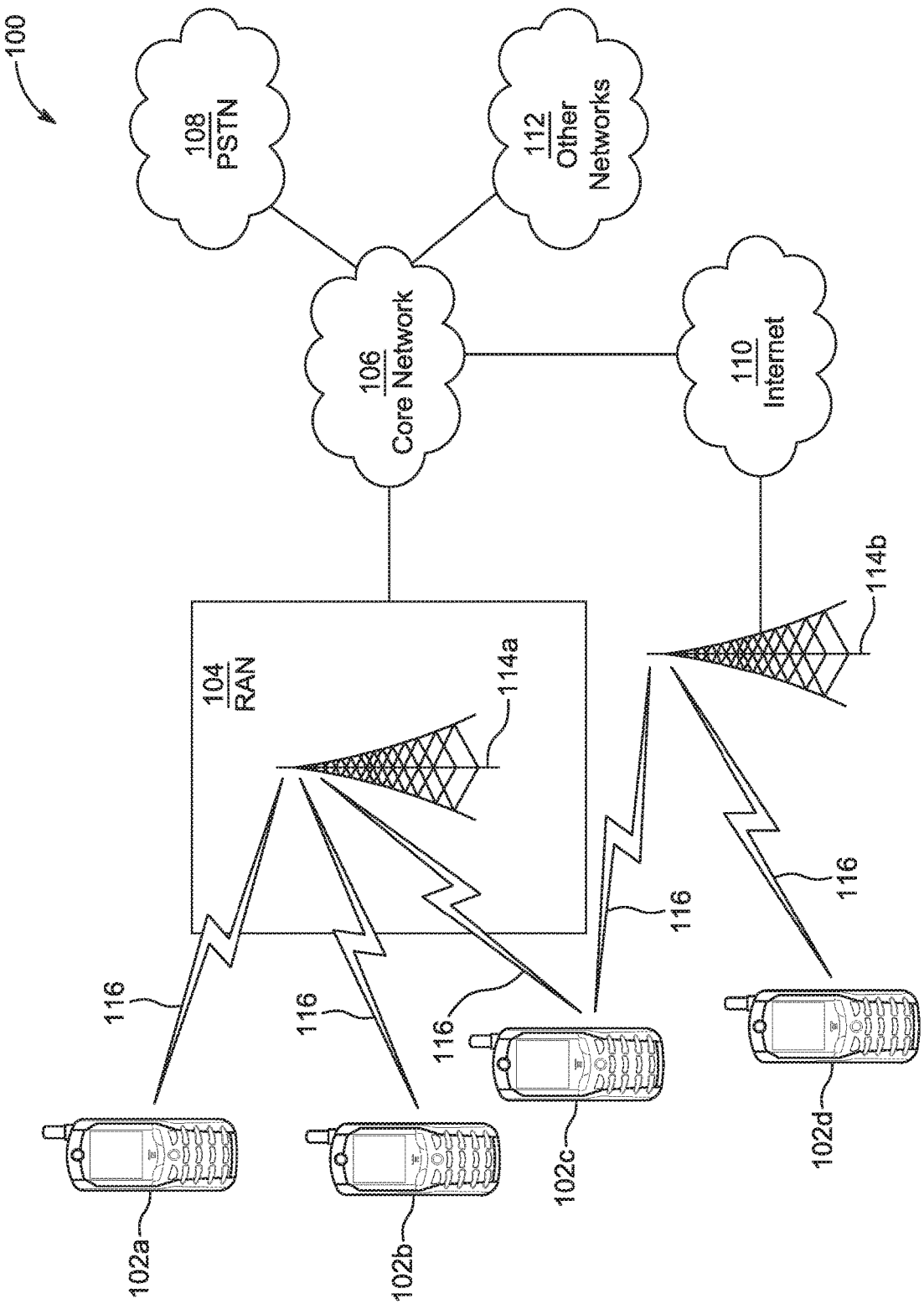
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
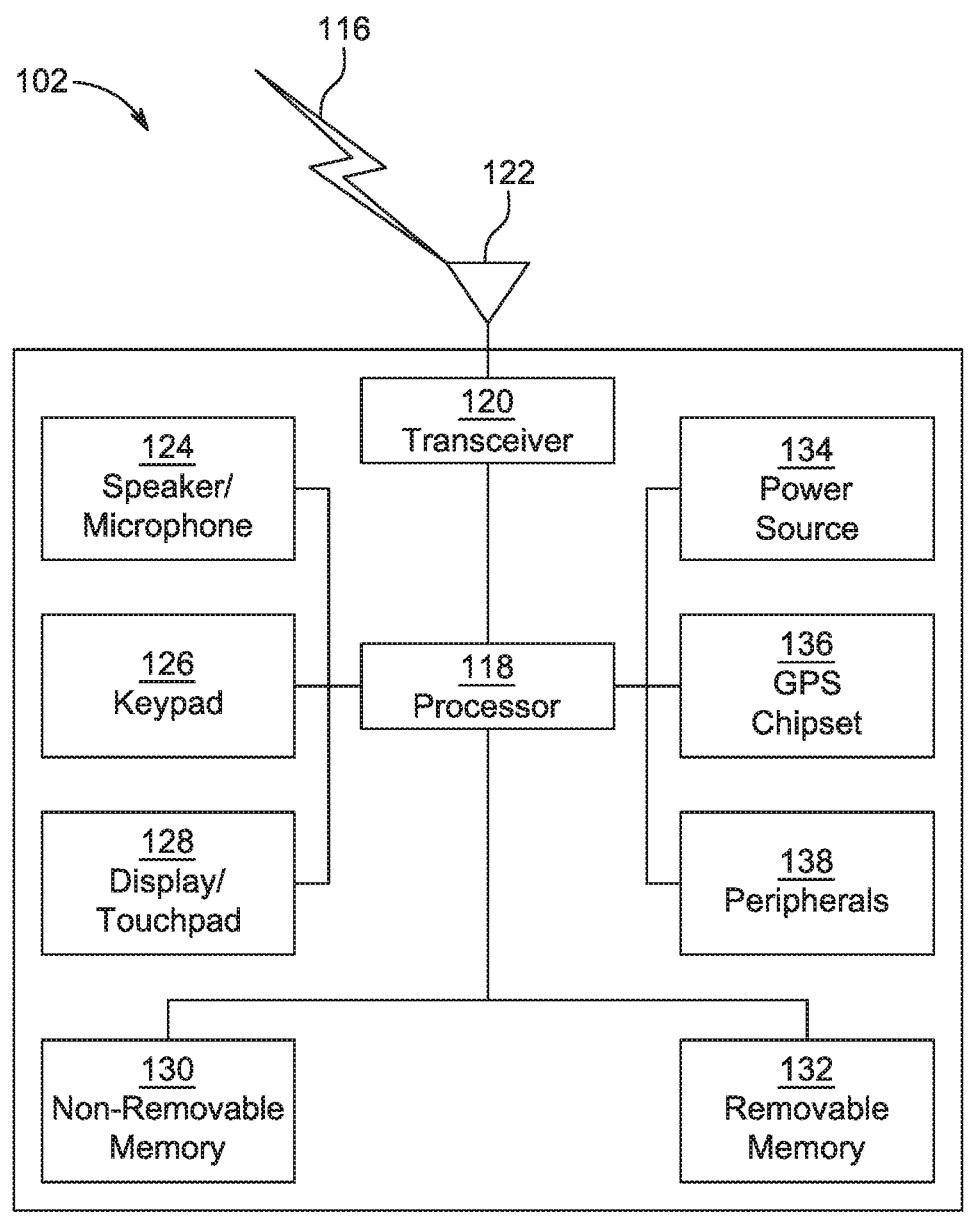
FIG. 1B is a system diagram illustrating an example wireless transmit/receive unit (WTRU) that may be used within the communications system illustrated in FIG. 1A according to an embodiment.
Figure 1C:
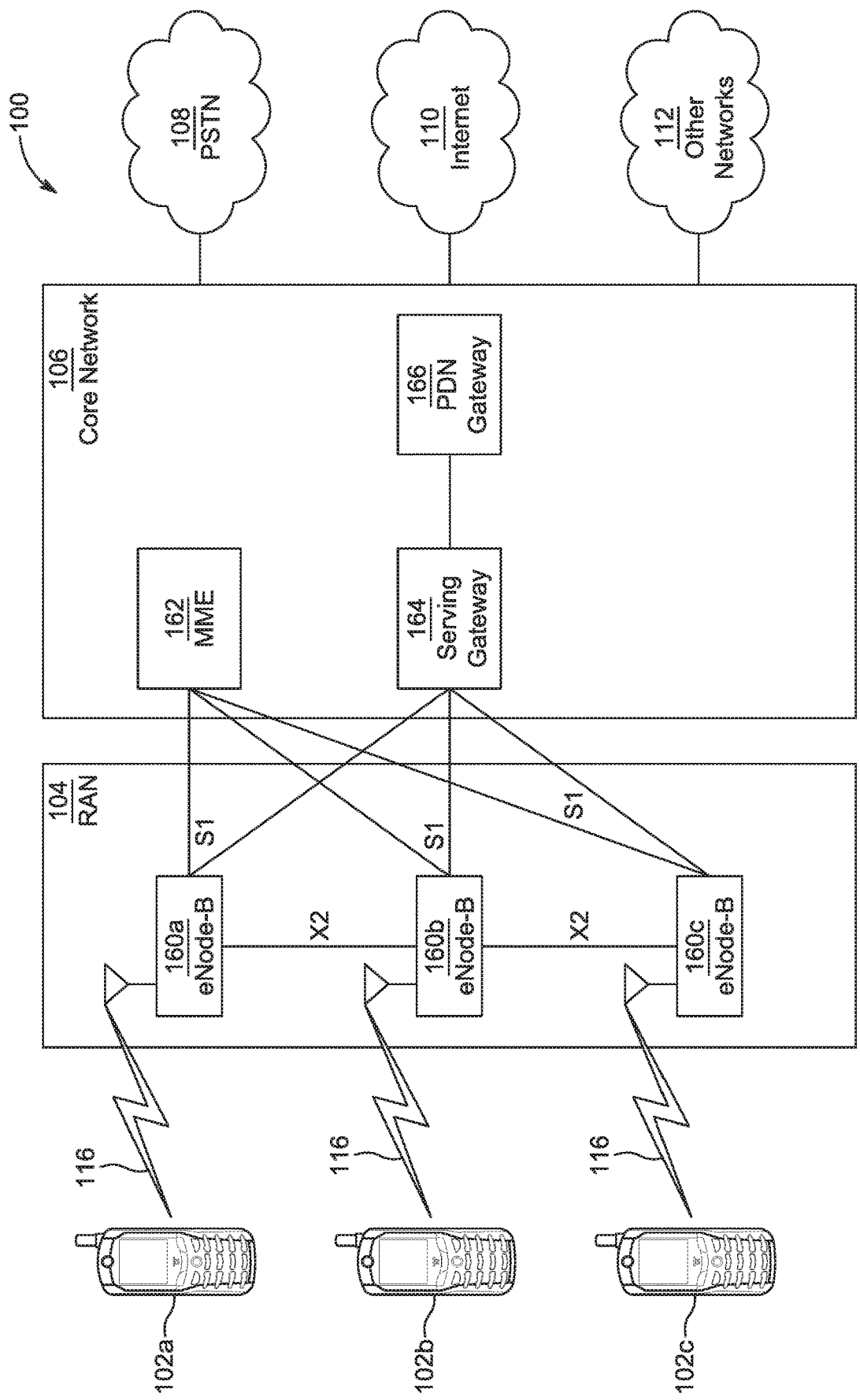
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
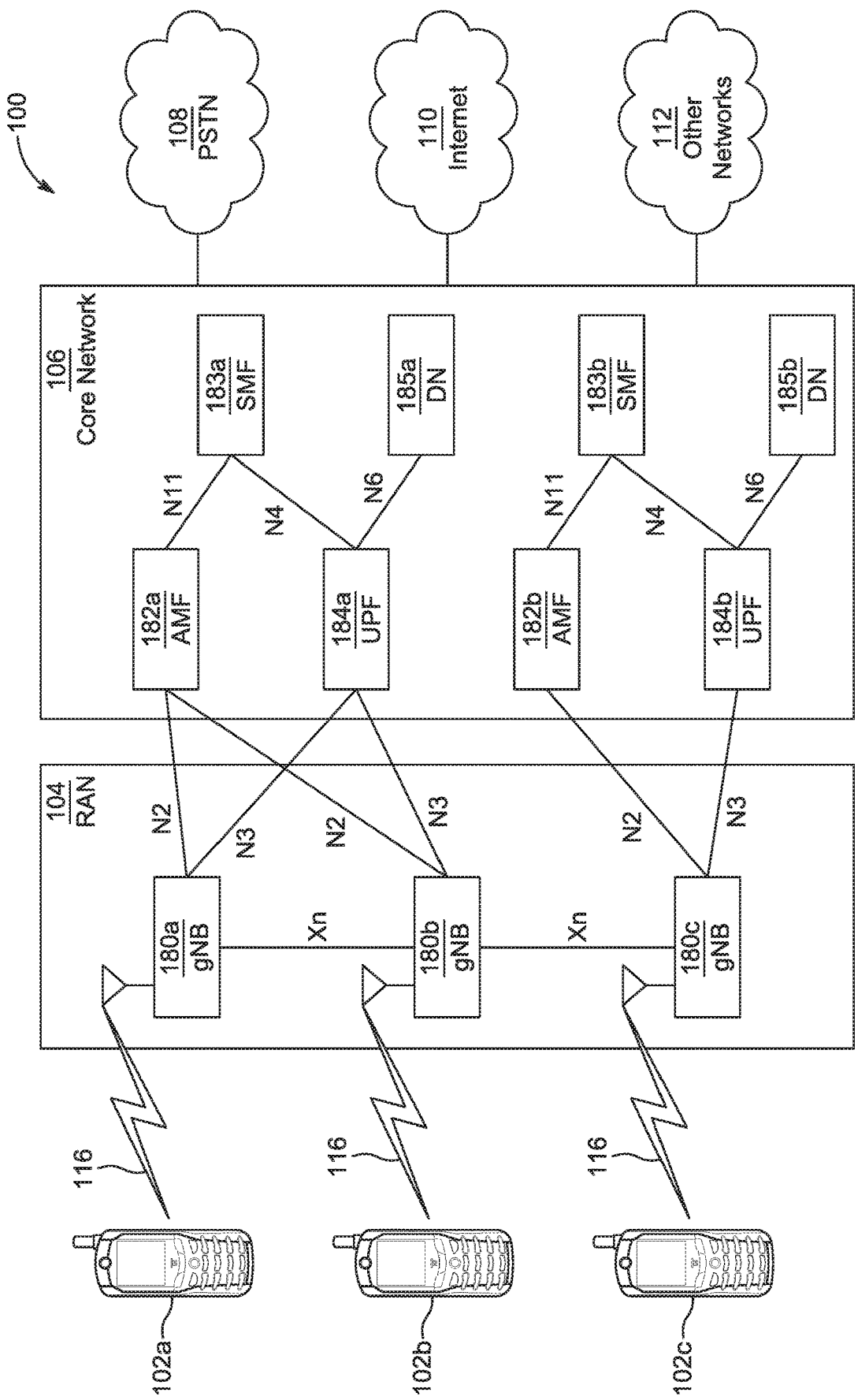
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-Third Generation Partnership Project (3GPP) access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The IEEE 802.11™ Extremely High Throughput (EHT) WLAN Study Group (SG) was created to explore the scope and purpose of a possible, future amendment to provide enhanced throughput, enhanced reliability, reduced latency and jitter and improved power efficiency in many usage scenarios. The IEEE Standard board approved the IEEE 802.11be Task Group (TG) based on a Project Authorization Request (PAR) and Criteria for Standards Development (CSD) developed in the EHT SG. The new generation WLAN devices are expected provide support to applications that require very low latency in addition to support require high throughput and high spectral efficiency. Example applications that are targeted to be supported by next generation WLAN, such as 802.11be, and requiring low-latency communications may include, but are not limited to include, 4K/8K video, gaming, virtual and augmented reality, remote office, and/or cloud computing. In 802.11be Project Authorization Request (PAR), latency is mentioned as one of the requirements because high-throughput, low latency applications will proliferate such as virtual reality or augmented reality, gaming, remote office and/or cloud computing.

In 802.11be Criteria for Standards Development (CSD), it is considered that traffic growth continues to be driven by significant growth in video traffic. The throughput requirements are in constant evolution with the emergence of 4K and 8K video, and high-throughput applications such as virtual reality, augmented reality, gaming, remote office, and cloud computing. With the throughput and real-time requirements of these applications, WLAN users may demand improved throughput and performance in delivering their applications in many environments.

3GPP fifth generation (5G) New Radio (NR) also support low latency transmissions. A 5G NR network is designed to support at least the following example service categories: enhanced mobile broadband (eMBB), massive machine type communication (mMTC) and ultra-reliable low latency communication (URLLC). Mechanisms and procedures designed for URLLC provide advanced services for latency sensitive devices or traffics. Configured grant transmission is adopted in 5G NR to reduce the frame exchanges of service request/response between gNB and WTRUs, so that WTRUs with low latency traffic are able to transmit the traffic in pre-configured resources without requesting transmission resources.

In WLAN, carrier sense multiple access with collision avoidance (CSMA/CA) channel access may be used for multiple access. A station (STA) may transmit without approval from an associated access point (AP) when the STA listens to the shared medium for a certain period and determines medium is free. For example, the channel sensing resolution may be 20 MHz or above.

In IEEE 802.11ax, OFDMA is adopted for both downlink and uplink transmission. Mechanisms and procedures are defined to enable one or more STAs to concurrently transmit in different frequency units. In an example, concurrent UL OFDMA transmissions for one or more STAs may be triggered and scheduled by the associated AP. Example methods may be supported for low latency transmissions such as UL OFDMA based random access (UORA) for associated and non-associated STAs, and/or null data packet (NDP) feedback report procedures.

In IEEE 802.11ax, a STA may perform autonomous uplink transmission either using a CSMA/CA procedure by sensing the entire channel, or using UORA. In an example of a UORA procedure, an AP may transmit a trigger frame with a set of resource units for associated STAs and/or unassociated STAs to transmit uplink traffic. The AP may assign uplink modulation and coding scheme (MCS), length and/or other related physical layer (PHY) parameters. A STA uses a UORA procedure to determine the resource and transmit one or more trigger-based Physical Layer Convergence Procedure (PLCP) Protocol Data Units (PPDUs). The AP may transmit an acknowledgement (ACK), such as one or more ACKs or a multi-STA block acknowledgement (BA), to the STAs.

An example trigger frame format for 802.11ax is shown in Table 1. An example expansion of the common information (info) field from the trigger frame is shown in Table 2. An example expansion of the user information (info) field of the trigger frame (except for an NDP feedback report poll (NFRP) trigger frame) is shown in Table 3. Tables 1-3 show the size of the fields in bits (where v indicates a variable length).

TABLE 1

Example trigger frame format in 802.11ax

| Frame Control | Duration | RA | TA | Common Info | User Info | ... | User Info | Padding | FCS |
|---|---|---|---|---|---|---|---|---|---|
| 2 | 2 | 6 | 6 | 8 or more | 5 or more | | 5 or more | v | 4 |

TABLE 2

Example common information field in trigger frame

| Common Info | Trigger Type | UL Length | More TF | CS Required | UL BW | GI and LTF Type | MU-MIMO LTF Mode | # of HE-LTF Symbols and Midamble Periodicity | ... |
|---|---|---|---|---|---|---|---|---|---|
| Bits | 4 | 12 | 1 | 1 | 2 | 2 | 1 | 3 | |
| UL STBC | LDPC Extra Symbol Segment | AP TX Power | Pre-FEC Padding Factor | PE Disambiguity | UL Spatial Reuse | Doppler | UL HE SIG-A2 Reserved | Reserved | Trigger Dependent Common Info |
| 1 | 1 | 6 | 2 | 1 | 16 | 1 | 9 | 1 | v |

TABLE 3

Example user information field in trigger frame (except for NFRP trigger frame)

| User Info (not for NFRP) | AID12 | RU Allocation | UL FEC Coding | UL MCS | UL DCM | SS Allocation/ RA-RU Information | UL Target RSSI | Reserved | Trigger Dependent User Info |
|---|---|---|---|---|---|---|---|---|---|
| Bits | 12 | 8 | 1 | 4 | 1 | 6 | 7 | 1 | v |

The trigger frame may include, but is not limited to include, any of a frame control field, a duration field, a receiver address (RA) field, a transmitter address (TA) field, a common information (info) field, a plurality of user information (info) fields, a padding field, and a frame check sequence (FCS) field. The common information field may include, but is not limited to include, any of a common information field, a trigger type field, an UL length field, a more TF field, a CS required field, an UL bandwidth (BW) field, a guard interval (GI) and long training field (LTF) type field, a multi-user (MU)-MIMO LTF mode field, a number of high efficiency (HE)-LTF symbols and mid-amble periodicity field, an UL space-time block code (STBC) field, an low-density parity check (LDPC) extra symbol segment field, an AP transmit (TX) power field, a pre-forward error correction (FEC) padding factor field, a packet extension (PE) disambiguity field, an UL spatial reuse field, a Doppler field, an UL HE SIG-A2 reserved field, a reserved field and/or a trigger dependent common info field. Each user information field may include, but is not limited to include, any of a user info field, an association identity (ID) (AID12) field, a resource unit (RU) allocation field, an UL FEC coding field, an UL MCS field, an UL dual carrier modulation (DCM) field, a spatial stream (SS) allocation/random access (RA)-RU information field, UL target received signal strength indicator (RSSI) field, a reserved field, and/or a trigger dependent user info field.

In 802.11ax, a null data packet (NDP) feedback report (NFR) may be supported. For example, an AP may transmit a trigger frame with trigger type NDP Feedback Report Poll (NFRP), in which the AP may indicate the feedback type is resource request. A starting association ID (AID) field may be included in the trigger frame. A HE MU PPDU may not be used to carry the NFRP trigger. A STA may use the NFRP trigger to know if it is scheduled and how to transmit a NFR. The STA may obtain NDP Feedback Report parameter(s) from the management frames. The STA may follow the instruction in NFRP trigger and NDP feedback report parameter(s) to transmit NFR. In an example, no acknowledgement may be sent from AP to the STAs for the NFR.

The trigger frame for NFRP may have the same frame format as shown in Table 1. The common information (info) field may be the same as in Table 2. An example user information (info) field for an NFRP trigger frame is shown in Table 4. The user information field for the NFRP trigger may include, but is not limited to include, any of a NFRP user info field, a starting AID field, an reserved field, a feedback type field, another reserved field, an UL target RSSI field, and/or a multiplexing flag field.

TABLE 4

User information field in trigger frame for NFRP trigger

| User Info (NFRP) | Starting AID | Reserved | Feedback Type | Reserved | UL Target RSSI | Multiplexing Flag |
|---|---|---|---|---|---|---|
| Bits | 12 | 9 | 4 | 7 | 7 | 1 |

A STA triggered by an AP (e.g., by receiving a trigger frame from the AP) may respond with a trigger-based PPDU. An example trigger-based PPDU format is shown in Table 5. The trigger-based PPDU may include, but is not limited to include, any of a legacy short training (L-STF) field, a legacy long training (L-LTF) field, an legacy signal (L-SIG) field, a repeated legacy signal (RL-SIG) field, an HE-SIG-A field, an HE-STF field, one or more HE-LTF fields, a data field and/or a PE field. Transmissions in response to UORA triggers may be with single data stream.

TABLE 5

Trigger based PPDU format for 802.11ax

| L-STF | L-LTF | L-SIG | RL-SIG | HE-SIG-A | HE-STF | HE-LTF | ... | HE-LTF | Data | PE |
|---|---|---|---|---|---|---|---|---|---|---|

Collisions may occur with UORA. UORA has been adopted in 802.11ax, such that a STA is able to transmit in UL using OFDMA without explicitly requesting resources and waiting for scheduling. However, resources allocated for UORA may be used by any STA in the BSS, thus it is possible that more than one STA may use the same resource to transmit, and thus collisions may occur and a transmission from a STA may not be acknowledged. If the STA does not receive any acknowledgement, the STA may not know whether its trigger-based (TB) PPDU (TB-PPDU) transmission was failed due to collision or low signal-to-noise ratio (SNR), or the STA may fail to detect and decode the acknowledgement from the AP. Therefore, the STA may only have the option of performing retransmission. Moreover, the AP may fail to detect transmissions in case of collision, and the AP may not know which STAs were transmitting, the number of STAs collided, and the type of traffic transmitted. Hence, the AP may not be able to reschedule the transmission based on STA/traffic priority and AP may not be able to perform network congestion control properly.

Issues may arise when separating or resolving collisions in the spatial domain in UORA. In 802.11ax UORA, a non-AP STA performing random access may use the same high efficiency long training field (HE-LTF) sequence in a TB-PPDU, so with multiple non-AP STAs sending on a same resource unit (RU), the AP may not be able to separate multiple STA transmissions in the spatial domain, even if the AP has many antennas. Single LTF may prevent an AP from estimating the channel from each accessing STA separately.

Figure 2:
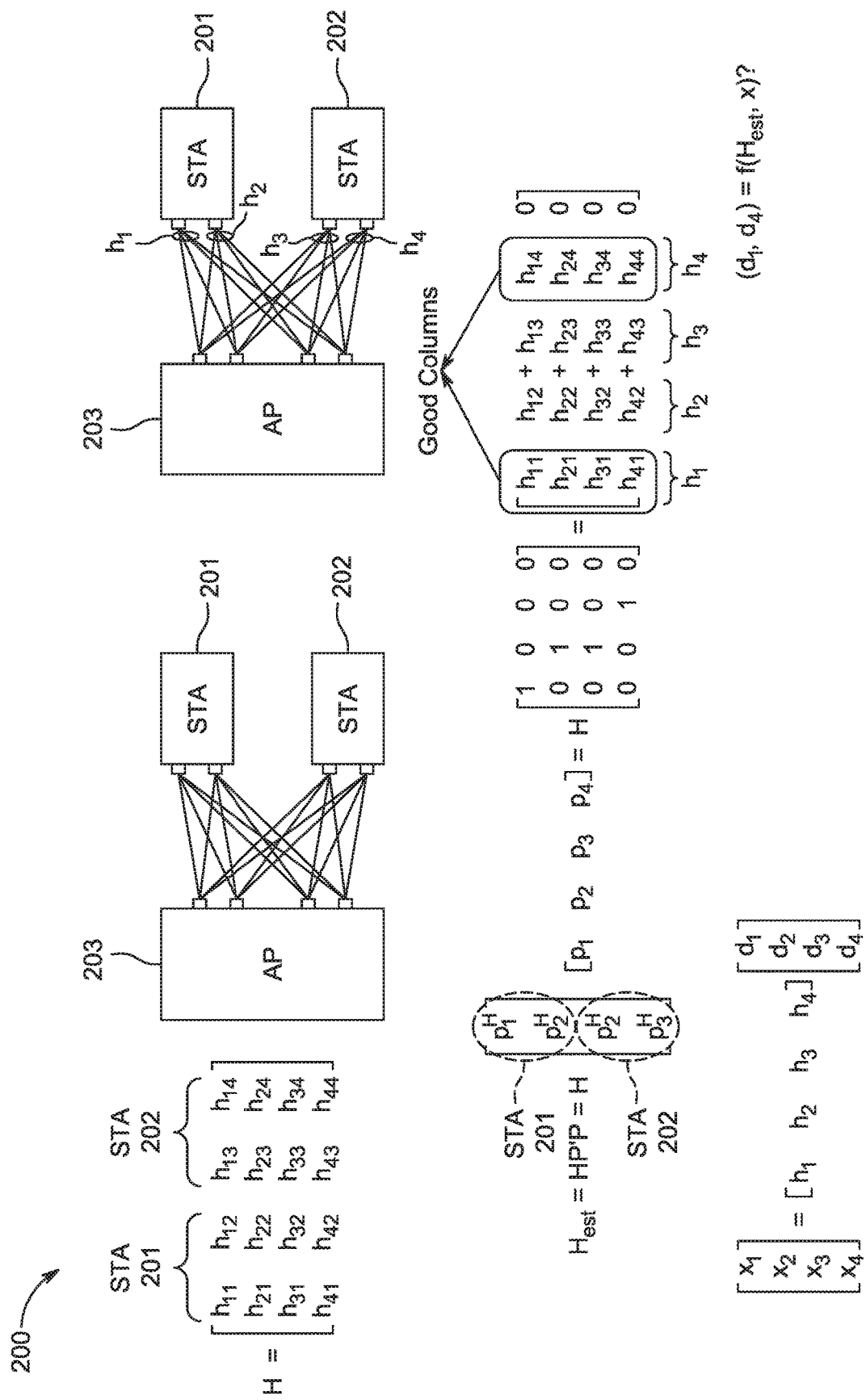
FIG. 2 shows a block diagram of example multi-user (MU) communication between an access point (AP) and stations (STAs), where non-collided spatial streams (SSs) are affected by collided SSs.

In an example, with multiple LTF sequences in a UORA TB-PPDU and each STA randomly choosing one or more LTF sequences, an AP still may not be able to separate different STAs signals in the spatial domain because of unknown channel. This may occur if more than one STA chooses the same LTF sequence. This is illustrated in the following examples. FIG. 2 shows a block diagram of example UL MU access 200 between an AP 203 and STAs 201 and 202, where non-collided spatial streams are affected by collided spatial streams. In this example, the H matrix is the physical MIMO channel coefficient matrix between the AP 203 and STAs 201 and 202, $H_{est}$ is the estimated channel matrix, and P=[p1 p2 p3 p4] is the orthogonal precoding matrix (e.g., as defined for LTF transmission) known at both the transmitter (e.g., STAs 201, 202) and receiver (e.g., AP 203). Each STA 201 and 202 has two antennas and knows that the AP 203 has four antennas. Thus, each STA 201, 202 may choose two columns in the P matrix as a precoding matrix to transmit its LTF. If MU UL transmission uses random access without any scheduling or coordination from the AP 203, one or two columns of the chosen P matrix may be the same for the STAs 201, 202. In this example, STA 201 choose P matrix columns P1 and P2, and STA 202 chooses P matrix columns P2 and P3 to precode their LTF symbols.

Thus, STA 201 performs random access with two SSs using randomly chosen LTFs $P_1^H$ and $P_2^H$. STA 202 performs random access with two SSs using randomly chosen LTFs $P_2^H$ and $P_3^H$. Because a SS from STA 201 and a SS from STA 202 use the same LTF $P_2^H$, the AP 203 may not be able to separate the two corresponding SSs. The SS(s) corresponding to $P_2^H$ are denoted as a collided SS, and the SS(s) corresponding to $P_1^H$ and $P_3^H$ are denoted as non-collided SS. Even though the non-collided SS uses different LTFs, the AP 203 may not be able to separate signals carried in an SS corresponding to LTFs $P_1^H$ and $P_3^H$, for example if $h_1$ and $h_4$ are not orthogonal to the space spanned by [$h_2$ $h_3$]. Thus, the receiver (e.g., the AP 203) channel estimation procedure for calculating $H_{est}$ includes the collision using P2. Because the AP 203 does not know the channel, the AP 203 uses the channel estimate $H_{est}$ to decode the transmitted data x=[x1 x2 x3 x4], where the decoded data $(d_1, d_4)$=f $(H_{est}, x)$.

This example also applies to the case that the two SS from STA 201 correspond to two different STAs using LTF $P_1^H$ and $P_2^H$, and/or the two SSs from STA 202 correspond to two different STAs using LTF LTFs $P_2^H$ and $P_3^H$. In this latter scenario, the collision between STAs experiencing SS collision may cause the AP 203 to incorrectly equalize the streams from STAs that do not have colliding SSs.

Procedures for low latency multi-link access and transmission may be used to improve performance of low latency traffic. Additionally, network link load measurements may be used for link evaluation. Measurement procedures may be designed for schedule-based access in 802.11ax.

In an example, collision awareness random access may be used to mitigate collision with UORA. To support low-latency small packet transmission, autonomous uplink transmission may be supported without resource request or resource scheduling transmissions. In an example, OFDM uplink transmission in WLAN may use autonomous transmission without a grant or scheduling received from the AP. In this case, the transmission may be single user access and uses the entire channel bandwidth, thus other STAs may wait for the entire medium to be free to perform transmissions. In another example, an autonomous uplink transmission may involve multiple uplink access.

In an example, trigger-based autonomous uplink transmission may be used for collision aware random access. An AP may transmit a modified trigger frame to trigger OFDMA random access with a collision awareness procedure. After the uplink transmissions, the AP and/or STAs may determine the transmission failure reason and further determine the remedy steps.

In an example, STAs may transmit additional LTF symbols so that the AP may be able to detect that one or more STAs may occupy the same resource. STAs may transmit separately encoded user specific control information, which may carry information such STA identity (ID), and/or traffic information. Based on the control information, the AP/STA may determine the way to perform a retransmission.

Collision awareness procedures may be performed with multiple LTF symbols and implicit re-scheduling methods. A collision detection mechanism using multiple LTF symbols may include any one or more of the following actions. STAs may transmit data in the uplink with $N_{UL}$ streams on the selected RU in the random pool. STAs may transmit multiple LTF symbols, for example, N LTF symbols, with an orthogonal format, for example, using N OFDM symbols for channel estimation and multiplying each OFDM symbol by using the elements of $N_{UL}$ rows of an orthogonal matrix with size N×N. The AP may estimate the number of STAs on the RU by estimating the number of rows used for the orthogonal matrix.

In an example, if the total number of rows used in the orthogonal matrix is $N_{UL} \times N_{STA}$, and if $N_{STA}$ is not an integer, the AP may declare failure and transmit a negative acknowledgment (NAK). In an example, the indices of the rows estimated, or the rows not used, may be announced. Hence, the collided STAs may learn the indices used in the transmission and update their choices for the indices in the next transmission based on a rule or at random. In this case, in an example where $N_{UL}>1$, the STAs using index i may be rescheduled to another RU j in the feedback. For example, if STA1 uses indices {1,2} and STA2 uses indices {2,3}, the AP may not decode the packet due to collision on index 2. Hence, the AP may transmit a NAK packet with a message which indicates re-scheduling information for STAs, for example, STAs using index 1, STAs using index 2, STAs using index 2, and STAs using index 3 may transmit on RU2, RU3, and RU4 for the next transmission, respectively. STAs may choose one of the RUs that AP indicated. For example, STA1 may use either RU2 and RU3 and STA2 may use either RU3 and RU4, which decrease the collision probability in the next transmission. In an example, STAs may repeat the transmission on assigned RUs.

In this case, in an example where $N_{UL} \geq 1$, the AP may announce a set of RUs for re-scheduling STAs which use index i of the expansion matrix in the feedback. STA may choose one of the RUs in the following transmission. For example, if STA1 uses indices {1,2} and STA2 uses indices {2,3}, the AP may not decode the packet due to a collision on index 2. The AP may transmit a NAK packet with message which indicates that STAs using index 1, STAs using index 2, STAs using index 2, and STAs using index 3 may use the RUs in set $S_1$={$RU_2$, $RU_3$}, $S_2$={$RU_5$, $RU_6$}, $S_3$={$RU_7$, $RU_8$}. Hence, STA1 may use one of the RUs in $S_1 \cup S_2$ while STA1 may use one of the RUs in $S_2 \cup S_3$ in the next transmission. In an example, STAs may repeat the transmission on assigned RUs.

In another example, if the total number of rows used in the orthogonal matrix is $N_{UL} \times N_{STA}$, $N_{STA} \geq 0$ and $N_{STA}$ is an integer, the AP may try to decode the PPDUs from $N_{STA}$ STAs. In this case, the AP may perform any one or more of the following operations. If the decoding is successful, the AP may transmit an ACK. STA IDs may be decoded at the MAC layer. The STA ID may also be transmitted along with ACK. If the decoding failed, the AP may transmit a NAK for the RU. The reason for failure may be because the channel cannot support the number STAs that access the channel, for example, there is a rank deficient, or collision still exists, but leads to an integer $N_{STA}$.

In an example, the indices of the rows estimated or the rows which are not used may be announced. Hence, the collided STAs may learn the indices used in the transmission and update their choices for the indices in the next transmission based on a rule or randomly. If $N_{UL} > 1$, in an example, the STAs using index i may be rescheduled to another RU j in the feedback. For example, if STA1 uses indices {1,2} and STA2 uses indices {2,3}, the AP may not decode the packet due to collision on index 2. Hence, the AP may transmit a NAK packet with message which indicates re-scheduling information for STAs, for example, STAs using index 1, STAs using index 2, and STAs using index 3 may transmit on RU2, RU3, and RU4 for the next transmission, respectively. STAs may choose one of the RUs that the AP indicated. For example, STA1 may use either RU2 and RU3 and STA2 may use either RU3 and RU4, which decrease the collision probability in the next transmission. In an example, STAs may repeat the transmission on assigned RUs.

If $N_{UL} \geq 1$, in an example, the AP may announce a set of RUs for re-scheduling STAs which use index i of the expansion matrix in the feedback. One or more STA(s) may choose one of the RUs in the following transmission. For example, if STA1 uses indices {1,2} and STA2 uses indices {2,3}, the AP may not decode the packet due to collision on index 2. The AP may transmit a NAK packet with message which indicates that STAs using index 1, STAs using index 2, STAs using index 2, and STAs using index 3 may use the RUs in set $S_1=\{RU_2, RU_3\}$, $S_2=\{RU_5, RU_6\}$, $S_3=\{RU_7, RU_8\}$. Hence, STA1 may use one of the RUs in $S_1 \cup S_2$ while STA1 may use one of the RUs in $S_2 \cup S_3$ in the next transmission. In an example, STAs may repeat the transmission on assigned RUs. Detailed examples of trigger-based procedures and PPDU design for collision awareness detection are described herein.

Figure 3:
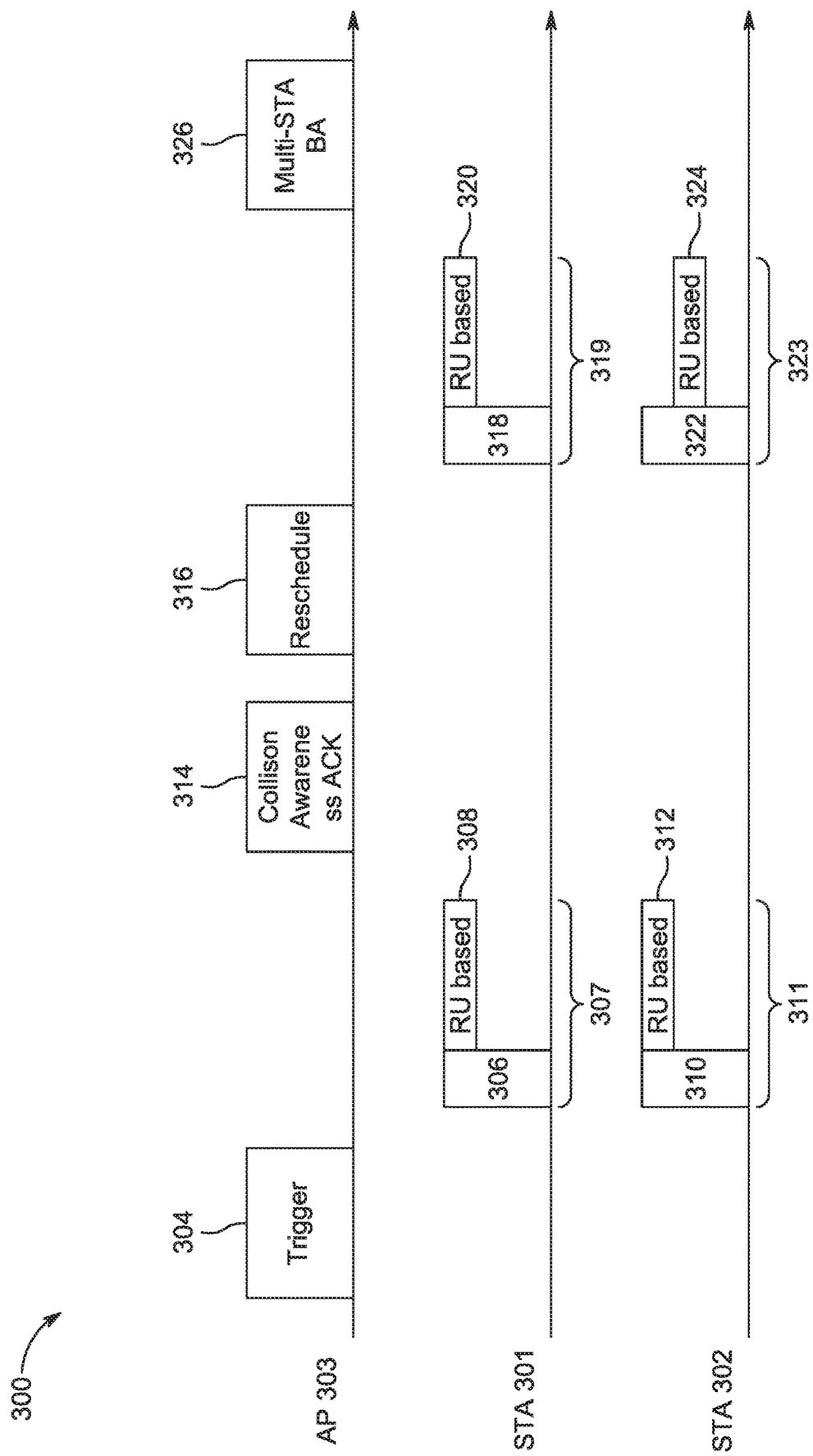
FIG. 3 shows a signaling diagram of an example collision awareness procedure with multiple long training field (LTF) symbols for orthogonal frequency division multiple access (OFDMA)-based random access (UORA)

FIG. 3 shows a signaling diagram of an example collision awareness procedure 300 with multiple LTF symbols for OFDMA-based random access. According to the example collision awareness procedure 300, an AP 303 may transmit a trigger frame 304 for multiple STAs 301 and 302 to randomly access the medium. The AP 303 may indicate the group of STAs or all the STAs 301 and 302 may be able to respond the trigger frame 304 or the AP 303 may indicate the trigger frame 304 is for OFDMA random access. The AP 303 may indicate the traffic type allow in the responding frames. For example, the AP 303 may indicate that low latency transmission(s) are triggered. The AP 303 may indicate extra LTF symbols may be used in the trigger-based PPDU. For example, the AP 303 may indicate the number of LTF symbols to be used in a trigger-based PPDU. A STA (e.g., STA 301 and/or STA 302) that receives the trigger frame 304 from the AP 303 and may check whether the STA is able to transmit. For example, a STA 301 or 302 may need to satisfy one or more of the following conditions: the STA 301 or 302 may be capable for UORA transmission and/or collision awareness UORA transmission; the STA 301 or 302 may be within the group identified by trigger frame to respond; the STA 301 or 302 may have traffic to transmit. If the trigger frame 304 identifies triggered traffic type or priority, the STA 301 or 302 may need to have traffic with that type or priority in order to transmit. The STA 301 or 302, which may respond the trigger frame, may perform a UORA procedure to select one or more RUs in which to transmit.

In the trigger-based PPDU 307 or 311, the STA 301 or 302 may have a wideband transmission part 306 or 310 and/or a narrowband transmission part 308 or 312. With a wideband transmission part 306 or 310, OFDM symbols may be transmitted over the entire bandwidth, for example, using a legacy PLOP header, and/or a legacy part of signalling field. The wideband transmission part 306 or 310 may be the same among all the trigger-based PPDU transmissions 307 and 311, so that the AP 303 may decode the PPDU transmissions 307 and 311 successfully. In an example, the wideband transmission part 306 or 310 may be used for backward compatible detection and/or synchronization.

With a narrowband transmission part 308 and 312, OFDM symbols may be transmitted over a narrow band, for example, EHT STF, EHT LTF, part of signalling field, and/or data field. For example, symbols may be transmitted over one or more RUs. The narrowband transmission part 308 and 312 may be considered as user specific. In an example, there may be an EHT-LTF or LTF field transmitted over a narrow band. The EHT-LTF field may be transmitted over more OFDM symbols. For example, if the data transmission 307 and 311 uses a single SS transmission, a single OFDM LTF field may be transmitted. However, more than one OFDM symbols with phase rotation based on the rows of an orthogonal matrix may be used for an EHT-LTF transmission. The additional EHT-LTF (A EHT-LTF) symbols may be used for collision detection, or in another words, for detecting a number of concurrent transmissions. For example, the additional EHT-LTF field may have several predefined patterns. Each STA 301 and 302 may randomly choose one pattern to transmit. A data field may be a field which carries the traffic.

The AP 303 may receive an uplink transmission 307 and 311 from one or more STAs 301 and 302. The AP 303 may perform collision detection on RUs assigned for OFDMA based UL random access. In an example, the AP 303 may detect the EHT-LTF field on each RU. By detecting the number of patterns based on the rows of an orthogonal matrix transmitted over the additional EHT-LTF field, the AP 303 may be able to detect the number of concurrent STAs 301 and 302 who transmit on the RU. In the case that more than one STA 301 or 302 is detected, the AP 303 may check the data field. The data detection may be corrupted due to collision, for example, more than one STA 301 and 302 may transmit on one of the RUs. In that case, the AP 303 may record the EHT-LTF pattern indices detected and the RU index. For example, the AP 303 may know that STA 301 transmitted on RU x with LTF pattern index 1 may be collided with STA 302 transmitted on RU x with LTF pattern index 2. This information may be used in the acknowledgement and rescheduling. In an example, the information based on the RU index and LTF pattern index together may be used to identify the STA 301 or 302 with a failed transmission. Dual indices [RU index, LTF pattern index] may be referred to as a STA PHY ID. The detection may not be accurate when two or more STAs 301 or 302 may use the same pattern for additional EHT-LTF transmissions. In this case, the AP 303 may not be able to determine if the transmission failure may be due to collision and simple NAK may be used in the acknowledgement.

The AP 303 may transmit a collision awareness ACK 314 to the STAs 301 and 302. In the collision awareness ACK message 314, the AP 303 may signal its detection results on each RU. For example, two bitmaps may be included. The first bitmap may carry N bit where N is the number of RUs assigned for random access. The first bitmap may indicate whether the RU may be correctly detected. The length of the second bitmap may depend on the number of failed transmissions over RUs. For example, M RUs were failed in the first bitmap, and thus the second bitmap may carry M bits. Each bit may indicate whether collision was detected on that RU. The AP 303 may transmit a frame 316 to reschedule the corrupted transmission, for example an interframe space (xIFS) time after the acknowledgement 314. xIFS may be 0 or any interframe spacing defined or to be defined. In an example, the frame 316 for rescheduling may be a trigger frame with RU-based collision awareness rescheduling. In an example, the AP 303 may use one bit to indicate RU based collision awareness rescheduling. When the bit is set, the AID field may be modified to carry the STA PHY ID, for example, [RU index, STF pattern index] in the previously failed transmission. RU/resource allocation mechanisms may follow the (trigger) frame 316. The STAs 301 and 302 may respond to the rescheduling frame 316 with (e.g., trigger-based) PPDU transmissions 319 and 323, which may include wideband transmission parts 318 and 322, and/or narrowband transmission parts 320 and 324, respectively. In the example procedures described herein, any one or more of the steps or mechanisms may be omitted or transmitted later in another transmission opportunity (TXOP). For example, the procedure 300 may include a trigger frame, a trigger-based PPDU and/or collision awareness ACK in a common TXOP. The AP 303 may determine whether it may perform a reschedule (message 316), for example, whether or not retransmissions may be rescheduled. In the case that the AP 303 performs a reschedule, the reschedule trigger frame 316, and any subsequent frames, may or may not be in the same TXOP.

Table 6 illustrates an example trigger-based PPDU format, which may be transmitted from a STA to an AP, in response to a trigger frame for collision awareness OFDMA-based random access.

may include the transmission of any one or more of the following example fields: EHT-STF field, which may be used for automatic gain control (AGC) adjustment; an EHT-LTF field, which may be used for channel estimation; and/or an additional EHT-LTF field (A EHT-LTF). The EHT-LTF field may be used for collision detection. The A EHT-LTF field may be transmitted over N OFDM symbols. N may be predefined (e.g., in a standard) or predetermined by the AP. In an example, the AP may indicate N in a trigger frame.

In an example, as part of the STA narrowband transmission, a method for A EHT-LTF transmissions may use an orthogonal matrix (e.g., the P matrix in 11ax). The P matrix is used as example below, but the method may be applied to other types of orthogonal matrix. According to the orthogonal matrix method, the choice of number OFDM symbols N may be [1, 2, 4, 6, 8,16]. The P matrix may be the orthogonal matrix defined in 802.11 for an LTF transmission with multiple data streams. The P matrix may be with size N×N, and each element in P may be denoted as $P_{ij}$, where i and j are integers between 1 and N. The STA transmitting the trigger-based PPDU, after selecting its transmission RU, may randomly select a number R between 1 and N. Alternatively, the number R may be predetermined or negotiated between the AP and the STA before the transmission. For example, R may be determined when the STA associates with the AP. The value R may be modified and renegotiated between the AP and the STA using management frames/control frames. The STA may use the $R^{th}$ row in the P matrix to modulate the A EHT LTF symbols. For example, the LTF modulated symbol transmitted on a kth subcarrier and an mth A EHT LTF symbol may be denoted as $s_{km}$. $s_{km}=P_{Rm} \times LTF_k$ where $LTF_k$ may be the kth symbol in LTF sequence. Hence, a STA with a different randomly selected R may use a different row of the P matrix to modulate the A EHT LTF. As a result, the receiving AP may be able to detect the number of concurrent STAs on the RU(s). Each row of the P matrix may be considered an LTF transmission pattern, and the row index may be used for an LTF pattern index. In an example, some procedures may be extended to multiple streams if multiple rows of P are utilized for multiple streams.

In another example, as part of the STA narrowband transmission, a method for A EHT-LTF transmissions may

TABLE 6

PPDU format for collision awareness OFDMA based random access using additional LTF fields

| L-STF | L-LTF | L-SIG | RL-SIG | EHT-SIG-A | EHT-STF RU x | EHT-LTF RU x | A EHT-LTF RU x | ... | A EHT-LTF RU x | Data on RU x | PE |
|---|---|---|---|---|---|---|---|---|---|---|---|
| 8 μs | 8 μs | 4 μs | 4 μs | 8 μs | 8 μs | v | v | | v | v | v |

In an example, L-STF, L-LTF, L-SIG, RL-SIG, and extreme high throughput signal A (EHT-SIG-A) fields are transmitted over the entire bandwidth. The contents of L-SIG, RL-SIG and EHT-SIG-A fields may be determined by the AP, so that transmissions from different STAs may have the same contents and modulated symbols. As shown in the example of FIG. 3, the STA narrowband transmission, which may use one or more RUs, may follow the STA wideband transmission. In the example shown in Table 6, a narrowband transmission may occur on RU x, however, it may be extended to one or more RU transmissions. In an example, the transmission may be over all the RUs, thus over the entire bandwidth. The narrowband transmission use a sequence. In this case, the smallest RU may have M subcarriers, and the sequence length may be M. Considering the number of OFDM symbols N, the overall sequence length may be shown as M×N. Therefore, given the sequence length, e.g., M×N, a set of sequences with good correlation properties may be defined. A constant amplitude sequence may be used in the frequency domain and time-domain cyclic shifted versions of OFDM symbols may be utilized for different streams. A good correlation property may be zero cross-correlation. The set may include Z predefined sequences. The STA that transmit the trigger-based PPDU may randomly select an integer number R between 1 and Z. The STA may use the sequence to transmit the LTF sequence in the selected RU(s).

The STA narrowband transmission may further include a data field. The transmission of the data field may be the same as the EHT-LTF field so that the channel estimate made using the EHT-LTF field may be applied to the data field. The STA narrow band transmission may further include a PE field. The PE field may be used to align the transmission and give the receiver enough process time the received transmission. In an example, the EHT-LTF field and A-EHT-LTF field are transmitted with the format shown in Table 6. In an example, the EHT-LTF field may not be transmitted and an A-EHT-LTF field may be transmitted.

In a collision awareness ACK message that is part of the collision awareness procedure (e.g., collision awareness procedure 300 shown in FIG. 3), the AP may signal its detection results on each RU. The collision awareness ACK frame may be any one or more of the following example types of frame. For example, the collision awareness ACK may be a medium access control (MAC) frame where the receive address (e.g., RA field) may be a broadcast MAC address. In another example, the collision awareness ACK frame may not contain any AID or individual MAC addresses. In an example, the collision awareness ACK frame may carry a STA PHY ID. The STA PHY ID may be defined by the location and/or spatial stream used by the STA in the latest/previous trigger-based transmission or other type of transmission. For example, the STA PHY ID may be a [RU index, LTF pattern index] or a combination of RU index and LTF pattern index.

In an example, a bitmap may be used for collision awareness acknowledgement. The bitmap size may depend on $N_{RU} \times N_{pattern}$, where $N_{RU}$ may be number of RUs available for OFDMA random access, $N_{pattern}$ may be number of patterns may be used for transmission on that RU. For example, $N_{pattern}$ may refer to number of LTF patterns to be used. Each bit may represent the detection results on that RU and pattern. For example, a bit of the bitmap may be set to 1 when energy detected on the RU using that pattern may be above a threshold, otherwise, it may be set to 0. Meanwhile, a block ACK (BA) or multi-STA BA may be transmitted for data detection results. In an example, a STA that may not receive a positive acknowledgement, may check the collision awareness acknowledgement. The STA may need to know the RU and pattern that the STA used for a previous transmission. The STA may check the corresponding bit in the bitmap, and all the other bits related to the same RU. Based on the bitmap results, the STA may determine whether there may be collision on that RU. For example, if the STA detects that multiple patterns with the same RU index may be set to 1, the STA may indicate that a collision may happen.

In another example, two bitmaps may be used for collision awareness acknowledgement. This method may assume that a single data stream is carried in each RU. The first bitmap may carry N bits, where N is the number of RUs assigned for random access. A bitmap may indicate whether the data on the RU may be correctly detected. For example, a bit may be set to 1 if the data may be correctly decoded 0 otherwise. The length of second bitmap may depend on the number of NAKs in the first bitmap. In an example, assuming that M RUs were failed (e.g., 0) in the first bitmap, the second bitmap may carry M bits. Each bit may indicate whether collision detected on that RU. For example, a bit may be set to 1 if more than one pattern were detected in the RU.

A STA may check the first bitmap and determine whether the previous data transmission was successfully decoded. If the previous transmission failed, the STA may check the second bitmap to determine whether a collision may occur in the RU. The proposed STA PHY ID based collision awareness acknowledgement may be implemented in a block ACK frame, such as in the example BA frame format shown in Table 7. A BA type value may be used to indicate STA PHY ID based collision awareness ACK as shown in Table 7.

TABLE 7

Example BA frame variant encoding

| BA Type | BA frame variant |
|---|---|
| 0 | Basic |
| 1 | Extended compressed |
| 2 | compressed |
| 3 | multi-TID |
| 4-5 | Reserved |
| 6 | CGCR |
| 7-9 | Reserved |
| 10 | GLK-GCR |
| 11 | multi-STA |
| 12 | Collision awareness |
| 13-15 | Reserved |

A BA information (info) field for a collision awareness ACK may be defined as Table 8, where a bitmap is used for collision awareness acknowledgement.

TABLE 8

Example BA information field for collision awareness ACK, where a bitmap is used for collision awareness acknowledgement

| number of RUs | number of patterns | RU and Pattern based Bitmap |
|---|---|---|

The number of RUs subfield may indicate the number of RUs the collision awareness acknowledgement may be used to signal. The number of patterns subfield may indicate the number of patterns used for each RU transmission. The RU and pattern based bitmap subfield provides the bitmap for RU and pattern based acknowledgement. The size of the bitmap may be determined by the number of RUs times the number of patterns.

According to a two bitmap collision awareness acknowledgment method, the BA frame format may be as shown in Table 9. A BA type value may indicate STA PHY ID based collision awareness ACK as shown in Table 7, and BA information (info) field for collision awareness ACK may be defined as in Table 9.

TABLE 9

BA information field for collision awareness ACK with two bitmaps

| number of RUs | Bitmap1 | Bitmap2 |
|---|---|---|

The number of RUs subfield may indicate the number of RUs the collision awareness acknowledgement may be used to signal. Bitmap1 may have a size set to the # of RUs. The bitmap may indicate whether the data on the RU may be correctly detected. Bitmap2 may have a size which may depend on the number of NAKs in Bitmap1. Each bit may indicate whether collision is detected on that RU.

Mechanisms may be used for scheduling UL retransmission, for example after a random access collision. In an example, an AP may schedule one or more UL retransmissions using a STA PHY ID. The definition of a STA PHY ID may be configurable. For example, the AP may assign a STA with a STA PHY ID x to RU y. In an example, the AP may use a trigger frame to schedule an UL retransmission. The trigger frame may be modified for a STA PHY ID based trigger. An example trigger frame with UL retransmission poll is shown in Table 10. The common information (info) field in the trigger frame may be as shown in Table 2. In the common information field, there may be a trigger type subfield. An UL retransmission poll trigger type may be indicated in the trigger frame to schedule UL retransmission, for example using a reserved value as shown in Table 10.

TABLE 10

Trigger type with UL Retransmission Poll

| Trigger Type Subfield value | Trigger frame variant |
|---|---|
| 0 | Basic |
| 1 | BF Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | UL Retransmission Poll |
| 9-15 | Reserved |

The user information (info) field may be the same as shown in Table 3, and the AID12 field may be used to carry STA PHY ID. The Trigger Dependent user information subfield may carry STA PHY ID timing information. The STA PHY ID timing information may be used to indicate when the STA PHY ID was generated. For example, the STA PHY ID timing information may be used to identify a time the STA used to perform UL OFDMA based random access with the corresponding STA PHY ID, RU and pattern. In an example, the STA PHY ID timing information may be time stamp or compressed time stamp for the previous UL transmission or the DL transmission.

In an example, control information in a UORA procedure may be user specific. The STAs that may be triggered for OFDMA based random access may transmit separately encoded user specific control information, which may carry information such, but not limited to, the STA ID and/or traffic information. Based on the control information, the AP/STA may determine a way to perform retransmission.

The determination whether to perform UL retransmission may use user specific control information for collision detection. User specific control information may still be detectable even in cases where the data transmission may fail due to collision. For example, in the frequency domain, data may be transmitted over N frequency units, and user specific control information may be transmitted over single or M frequency units, where M<N. Frequency units may be RUs or a set of subcarriers. Each STA may randomly choose a starting point S between 1 and N, and may transmit the STA's user specific control information from S frequency unit to S+M or mod(S+M, N) frequency unit(s). Cyclic allocation among the N frequency units may be permitted. Different STAs may have non-overlapping, partially overlapping or overlapping allocation in the N RUs. In the case they are non-overlapping or partially overlapping, the AP may be able to detect full or partial of the user specific information. Thus, even when the data transmissions collide, the user specific control information may be decodable and deliver useful information.

In the time domain, a data transmission and user specific control information may use the same number of frequency units. User specific control information may occupy M OFDM symbol in the frame, where N OFDM symbols may be assigned for user specific control information transmission and N>M. Each STA may randomly choose a starting point S between 1 and N, and transmit its user specific control information from S OFDM symbol to S+M or mod(S+M, N) OFDM symbol. Cyclic allocation among the N OFDM symbols may be allowed. Different STAs may have non-overlapping or partially overlapping or overlapping allocation in the N RUs. In the case they are non-overlapping or partially overlapping, the AP may be able to detect full or partial user specific information. Thus, even when the data transmissions collide, the user specific control information may be decodable and may deliver useful information from the STA to the AP.

In the code domain, a data transmission and user specific control information transmission may use the same frequency units and no extra unallocated OFDM symbols for control information transmission. In this case, the user specific control information may be transmitted using lower data rate than data. In an example, the user specific control information may be coded with a spreading code or cover code. A set of spreading codes/cover codes may be predefined in the system. The codes may be orthogonal or with zero cross correlation property. A STA may randomly select a code or be assigned a code by the AP. The AP may use the codes saved in the system to detect the control info.

In the spatial domain, a data transmission and user specific control information transmission may use the same frequency units and no extra unallocated OFDM symbols for control information transmission. However, it may be assumed that an AP and STAs may have multiple antennas. Data transmission(s) may use N data stream transmissions and user specific control information may use M stream transmissions. Here M<N. A STA may randomly select M streams among N streams to transmit.

User specific control information may include, but is not limited to include, any one or more of the following example parameters: STA ID, compressed STA ID, and/or field(s) including traffic parameters. The user specific control information fields may be separately encoded and protected from the data field. In an example, the User specific control information field may be carried in the SIG-B field (EHT-SIG-B field).

By performing detection on user specific control information from the STAs, the AP may determine the STA ID, traffic type and/or corresponding RU(s) for the corresponding data transmission(s). The AP may try to decode a data field. If AP fails to decode the data field, the AP may schedule a retransmission based on a traffic type for the STA ID. For example, the AP may schedule a retransmission immediately if the traffic has a low latency requirement. The AP may schedule periodical transmissions if the traffic requires one or more periodic resource allocations, for example a semi-persistent resource allocation.

A collision detection mechanism using user specific control information may include any of the following example procedures. In an example, an AP may transmit a trigger frame for multiple STAs to randomly access the medium/channel using OFDMA. The AP may indicate that user specific control information is included in the trigger-based PPDU. The STA, which may respond the trigger frame, may perform a UORA procedure to select one or more RUs to transmit. In the trigger-based PPDU, the STA may have include any of the following fields of information: user specific control information field and/or data field. The STA may randomly select time/frequency/spatial/code domain resources for UL transmission. The AP may receive uplink transmission from one or more STAs. The AP may perform collision detection on RUs assigned for OFDMA based UL random access. If the AP is able to detect both the user specific control information field and data field in an UL transmission, the AP may send positive acknowledgement to the STA. If the AP is able to detect the user specific control information field but fails to detect the data field of an UL transmission, the AP may read the STA ID and traffic parameters from the control field. In this case, the AP may send a negative acknowledgement to the STA using the STA ID. The AP may indicate that the transmission failure may be due to collision in the channel. The AP may indicate implicitly or explicitly that the AP is aware of the resource request and may schedule it later. The AP may allocate resource(s) for the STA to retransmit the data based on traffic parameters. If the AP does not detect the user specific control information field or the data field, the AP may send a positive acknowledgement to the STA without collision detection results. The STA that receives the acknowledgement may transmit a resource request later or may wait for a random access opportunity at a later time.

The AP may transmit a collision awareness ACK to the STAs. In the collision awareness ACK, the AP may signal its detection results on each RU or on each detected STA ID. For example, an RU-based collision awareness acknowledgement may be used. Transmissions may be STA ID based. For each detected STA ID, the AP may signal whether it has successfully detected the data field. A STA may check the acknowledgement. If the STA ID of the STA is not included in the acknowledgement, the STA may consider that the transmission(s) of the control information field and the data field are lost (e.g., due to collision). If the STA ID is included in the acknowledgement, but a negative acknowledgement is received for the STA, the STA may determine that control information was successfully delivered to the AP, but data portion may be lost. The STA may be aware that the AP knows the transmission request from the STA and that the STA may expect a resource allocation later. If the STA ID is included in the acknowledgement, and a positive acknowledgement is received for the STA, the STA may determine that the data transmission was successful.

Figure 4:
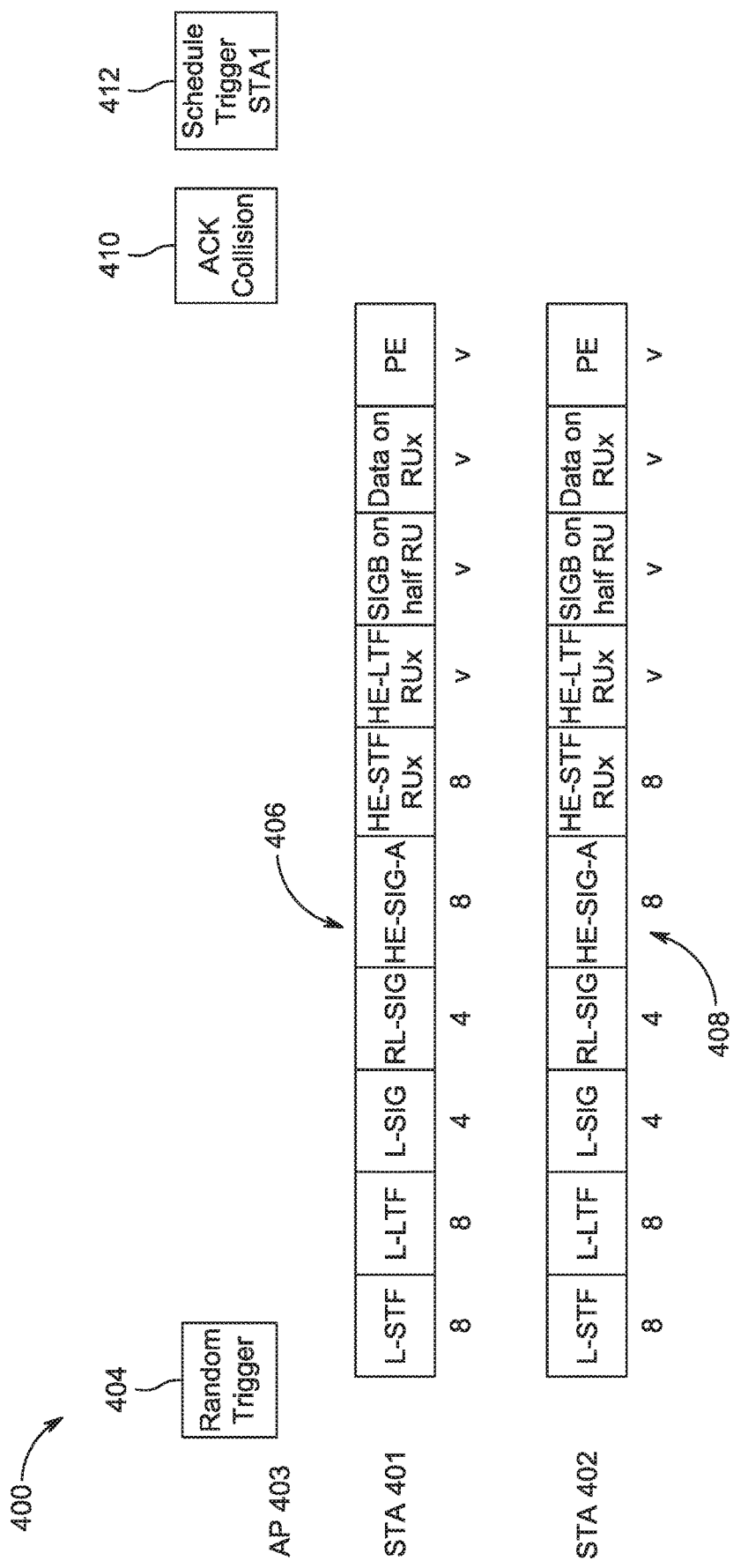
FIG. 4 shows a signaling diagram of an example collision awareness transmission procedure using signal-B (SIG-B) fields as part of user specific control information fields for random trigger collision detection.

FIG. 4 shows a signaling diagram of an example collision awareness transmission procedure 400 using SIG-B fields as part of user specific control information fields for random trigger collision detection. Any portion of the methods and frame formats described herein may be included as part of the example collision awareness transmission procedure 400. According to the example collision awareness procedure 400, an AP 403 may transmit a trigger frame 404 for multiple STAs 401 and 402 to randomly access the medium (channel). The STAs 401 and 402 may respond with trigger-based PPDU frames 406 and 408, respectively. The trigger-based PPDU frames 406 and 408 may include the following fields, which may be included in a wideband transmission part: L-STF, L-LTF, L-SIG, RL-SIG, HE- and/or SIG-A. The trigger-based PPDU frames 406 and 408 may include the following fields, which may be included in a narrowband transmission part (e.g., transmitted over occupied RUs, such that the RUs may be randomly selected by the STAs 401/402): EHT-STF (e.g., in RU x), EHT-LTF (e.g., in RU x), SIG-B (e.g., on a partial RU such as half an RU), data (e.g., on RU x, or on one or more RUs), and/or PE (e.g., on the same RUs as the data field). The EHT-LTF field may enable collision-aware channel estimation for the SIG-B and/or data fields. The SIG-B field may use RU based transmissions and may include the STA ID information. For example, the SIG-B field may be transmitted over one or more RUs, or over a partial RU (e.g., with user specific cover codes to avoid collision). The AP 403 may transmit, to the STAs 401 and 402, a collision awareness ACK/NAK 410 for STAs detected in the SIG-B fields on one or more RUs. The AP 403 may transmit, to the STAs 401 and 402, scheduling retransmission frame 412 to reschedule the corrupted transmission(s).

Figure 5:
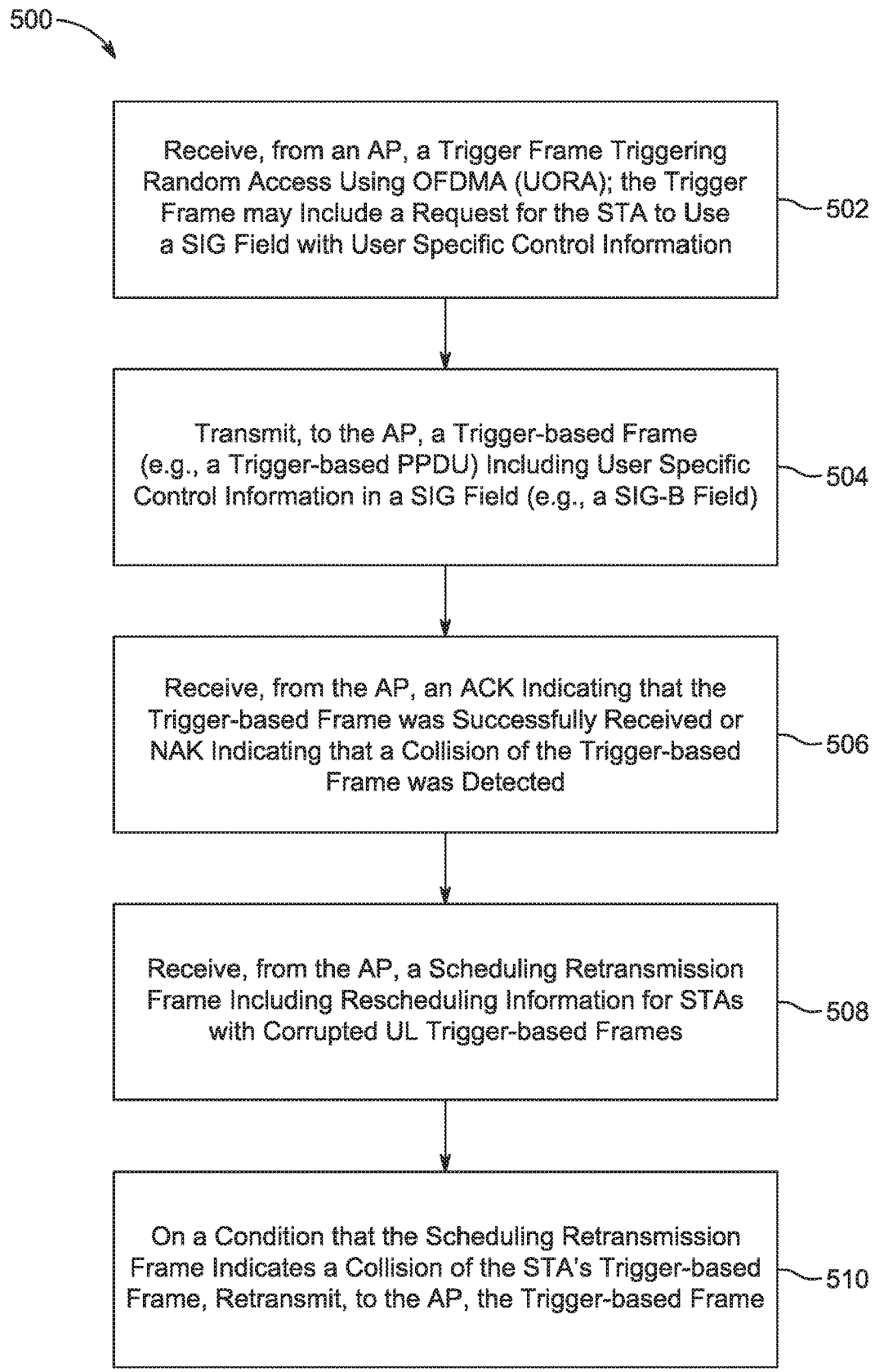
FIG. 5 shows a flow diagram of an example collision detection procedure using user specific control information in a PHY SIG-B field.

FIG. 5 shows a flow diagram of an example collision detection procedure 500 using user specific control information in a PHY SIG field (e.g., a SIG-B field), which may be performed by a STA (e.g., multiple STA's in parallel) in a UORA system. Any portion of the methods and frame formats described herein may be included as part of the example collision detection procedure 500. At 502, the STA may receive, from an AP, a trigger frame triggering random access using OFDMA. The trigger frame may be transmitted by the AP to multiples STAs. The trigger frame may include, but is not limited to include, a request for the STA to use the SIG field with user specific control information. At 504, the STA may transmit, to the AP, a trigger-based frame (e.g., a triggered-based PPDU) including user specific control information in a signal (SIG) field. In an example, the SIG field is a SIG-B field, although any other type of signal (SIG) field may be used. The STA may transmit the trigger-based frame as part of an UL MU transmission along with the transmission of trigger-based frames by other STAs. The trigger-based frame may include, but is not limited to include, in the user specific control information a STA ID, traffic load information (traffic load indication), traffic latency information and/or other traffic quality of service (QoS) related information. The SIG field may be transmitted using a partial RU. The SIG field may be transmitted using a cover code in the field.

At 506, the STA receives, from the AP, an acknowledgment/negative acknowledgment (ACK/NAK) indicating that the STA's trigger-based frame was successfully detected at the AP (ACK) or that the trigger-based frame was not successfully detected at the AP (e.g., a collision of the STA's trigger-based frame was detected) (NAK). In an example, the STA may not receive a NAK from the AP but may assume a collision of the STA's trigger-based frame occurred when no ACK is received after a period of time. At 508, the STA receives, from the AP, a scheduling retransmission frame including rescheduling information for STAs with corrupted UL transmissions. The scheduling retransmission frame may be a trigger frame. At 510, on a condition that the scheduling retransmission frame indicates that a collision of the STA's trigger-based frame was detected, the STA may retransmit the trigger-based frame. Thus, the use of the SIG-B field in the example collision detection procedure 500 enables the AP to quickly detect a STA's transmission and schedule corresponding retransmissions.

In an example, collisions may be separated and/or isolated in the spatial domain. For example, STAs with more than one antenna may precode a random access transmission such that either the STA's signal in the collided SS may be separated, or the STA's signal is isolated from the collided SS. The collided SSs are the SSs with the same channel estimation sequence, but carry data from more than more STA (e.g., more than one STA may be using the same LTF when transmitting to the AP). For example, the SSs corresponding to $P_2$ described in FIG. 2 are examples of collided SSs.

In a PPDU carrying a trigger frame for random access, the AP may transmit m LTF sequences. The value m may correspond to the number of antennas/sectors of the AP. With the assumption of channel reciprocity, a non-AP STA i may use the PPDU carrying a trigger frame to perform a channel estimation from the STA to the AP, as $H_i$, which is a m×n matrix, where n is the number of the antennas of STA i. An AP may announce an m×l matrix $V=[V_1 \ V_2 \ldots V_l]$, where l≤m. $V_1 \ldots V_l$ are linearly independent vectors. In an example, matrix V may be implicitly understood by non-AP STAs and may not need signaling of V from the AP. In this case, the AP and non-AP STA may share a common seed that is used to generate V independently at the AP and the non-AP STAs, based on the index of the time/frequency resource.

Figure 6:
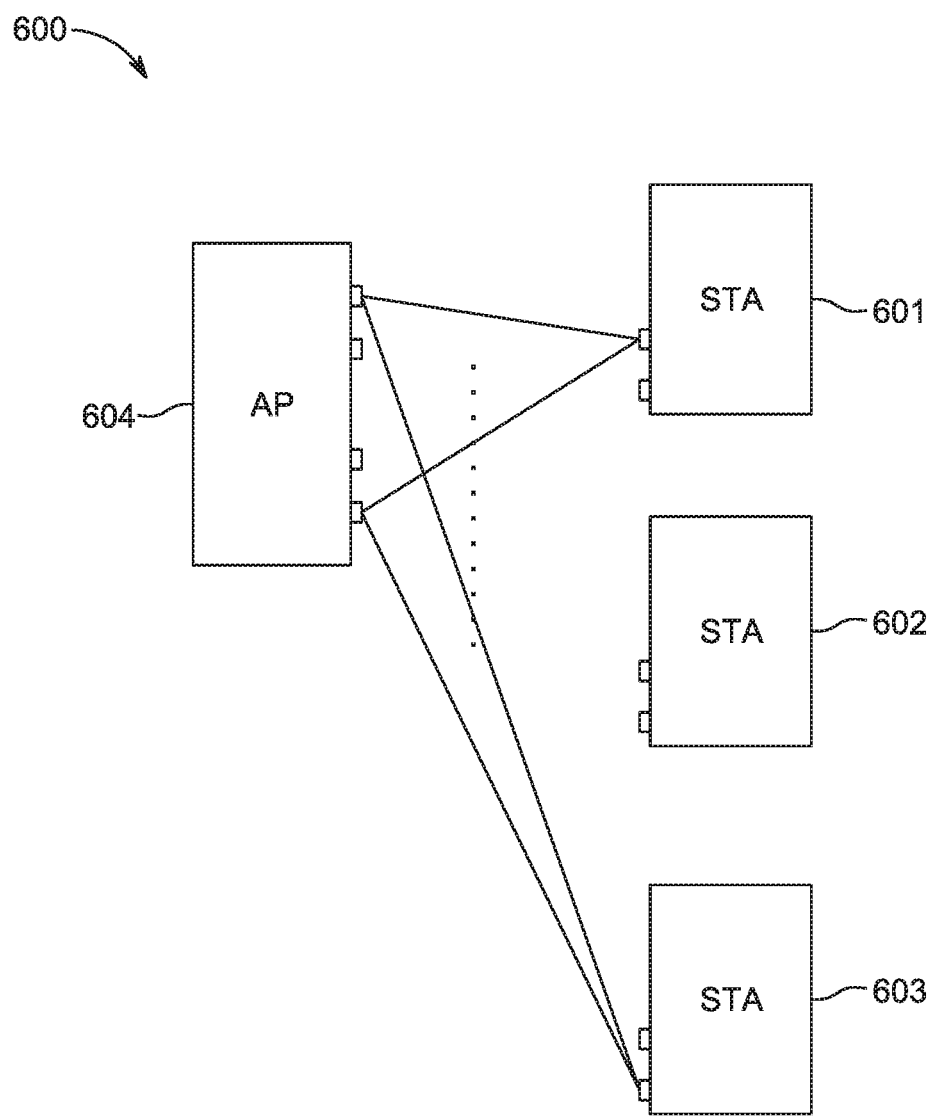
FIG. 6 shows a system diagram of a wireless network including STAs performing random access.

FIG. 6 shows a system diagram of a wireless network 600 including STAs 601, 602, and 603 performing random access. In an example, if STA 601 transmits an UL frame using LTFx, and STAs 602 and 603 transmit UL frames using LTFy, and if the AP 604 estimates the channel and separate signals for all STAs 601, 602, 603, then the AP 604 may separate the collided SS. In another example, if STA 601 transmits an UL frame using LTFx, and STAs 602 and 603 transmit UL frames using LTFy, and if the AP estimates the channel for STA 601 and separates the UL signal from STA 601 from the UL signals from STAs 602 and 604, then the AP may isolate the collided SS.

In an example, random access STA singular value decomposition (SVD)-based precoding may be performed. A non-AP STA i may perform SVD decomposition of the channel according to Equation 1:

$$H_i = U_i \Sigma_i W_i^H \qquad \text{=Equation 1}$$

According to the methods described in the following, the STA may choose a column of $W_i$ to precode a SS for random access.

In an example method, SVD-based precoding may be employed to separate collided SSs. Only a non-AP STA i observing a j-th column of the STA's $U_i$ matching any column of V, may perform random access. The STA may precode the STA's transmission with the j-th column of $W_i$ to form a SS. The STA i that has g>1 columns of its $U_i$ matching g columns of V, may send g SS precoded with the corresponding columns of $W_i$. If two STAs i and j, precoding based on different columns x and y of V, the AP may be able to perform separate channel estimations, and separate the collided SS signal, where z is the received signal:

$$z=(U_i\Sigma_i d_a + U_j\Sigma_j d_b)=(V_x\sigma_{i,a} + V_y\sigma_{j,b}) \qquad \text{Equation 2}$$

$U_{i,a}=V_x$ and $U_{i,j}=V_y$, and $U_{i,a}$ is the a-th column of $U_i$, $U_{j,b}$ is the b-th column of $U_j$ and $d_a$ is a n×1 vector with a-th element equal to 1. The rest of the elements may be set equal to 0. $\sigma^{i,a}$ is the element at the a-th column and a-th row in $\Sigma_i$, and z is the received signal, because $V_x$ and $V_y$ are linearly independent, $\sigma^{i,a}$ and $\sigma_{j,b}$ may be solved to estimate channels from the two STAs i and j. According to this example approach, only STAs that choose the same column of V for precoding may collide. The AP may separate STAs using the same LTF but precoding based on different columns of V.

Different STAs may use a common LTF sequence. In an example, STAs may randomly pick an LTF sequence such that if more than one STA chooses the same $V_j$, the AP may estimate a lower bound of the number of STAs involved in the collision. In the case that each random access STA only has one antenna, and V is an orthogonal matrix, the AP may use rows of $V^H$ to precode LTFs in TF as sectors, and or the STA(s) that receive(s) trigger frame from only one AP sector may perform random access.

In another example method, SVD-based precoding may be used to isolate collided SSs. In this case, the columns of V may be separated into $V=[U_{a1}, U_{a2}, \ldots U_{aq}]$, where each $U_{ai}$ may consist of one or more m×1 orthogonal or linearly independent column vectors. For any column of $U_{ai}$ and any column of $U_{aj}$, the two columns are linearly independent for any i≠j. This sub-space separation is known by random access STAs. Only a non-AP STA i observing a j-th column of its $U_i$ entirely within the sub-space spanned by $U_{as}$, s∈{1 ... q}, may perform random access. The STA precodes its transmission with the j-th column of $W_i$ to form a SS. The STA may choose a random LTF sequence for this SS. The STA i which has $g_1$>1 column of its $U_i$ entirely within the sub-space spanned by $U_{as}$, may send $g_1$ SS precoded with the corresponding columns of $W_i$ with different LTF sequences for the $g_1$ SS. The STA i which has $g_2$>1 column of its $U_i$ each entirely within the $g_2$ sub-spaces spanned by different $U_{as_1}, U_{as_2}, \ldots U_{as_{g2}}$, may send $g_2$ SS precoded with the corresponding columns of $W_i$ with same or different LTF sequences for the $g_2$ SS.

If two STAs i and j choose the same LTF sequence k, but precode based on columns of different $U_{ax}$ and $U_{ay}$ of V, the AP may be able to perform separate channel estimations, to separate the collided SS, where z is the received signal:

$$z=(U_i\Sigma_i d_f + U_j\Sigma_j d_e)=(U_{ax}c_x\sigma_{i,f}+U_{ay}c_y\sigma_{j,e}) \qquad \text{Equation 3}$$

where $U_{i,f}=U_{ax}c_x$, $U_{j,e}=U_{ay}c_y$, and $U_{i,f}$ is the f-th column of $U_i$, $U_{j,e}$ is the e-th column of $U_j$. Because $U_{ax}$ and $U_{ay}$ are linearly independent, $c_x\sigma_{i,f}$ and $c_y\sigma_{j,e}$ may be solved to estimate channels from the two STAs i and j. In this approach, the STAs that choose the same LTF sequence and the same $U_{ai}$ for precoding may collide. However, the collision may not affect another STA choosing the same LTF sequence but a different $U_{aj}$ for precoding. In the case that the random access STAs only have one antenna, and V is an orthogonal matrix, the AP may use rows of $V^H$ to precode LTFs in the trigger frame as sectors. STAs that receive the trigger frame from APs in only one of the defined subsets of AP sectors may perform random access. In an example where the subset 1 has sectors 1,2, and subset 2 has sectors 3,4, a STA that receives either sectors 1 or 2 or both, but receives neither of sectors 3,4, may perform random access on the channel.

In another example method, random access STA precoding may be based on channel-inversion to isolate collided SS. In this method, the non-AP STAs have a number of antennas equal to or more than the rows of V. A non-AP STA i may precode its random access signal for one SS as one of the columns of V:

$$V_j = H_i P_{i,j} \qquad \text{Equation 4}$$

where $\|V_j\|=\|V_k\|$ for any j,k columns in V. $P_{i,j}$ is the precoding vector for STA i based on $V_j$:

$$P_{i,j}=(H_i^H H_i)^{-1} H_i^H V_j \qquad \text{Equation 5}$$

STA i may choose a $P_{i,j}$ with the smallest norm to save power. Otherwise, STA i may randomly pick a j from which it may solve $P_{i,j}$. In an example including STA1, STA2, STA3, STA1 may choose the $1^{st}$ column of V and STA2 and STA3 may choose the $2^{nd}$ column of V for precoding, where z is received signal:

$$z = [H_1 H_2 H_3] \begin{bmatrix} P_{1,1}s_1 \\ P_{2,2}s_2 \\ P_{3,2}s_3 \end{bmatrix} = [V_1 s_1 + V_2(s_2 + s_3)] \quad \text{Equation 6}$$

In this example, STA2 and STA3 may encounter a collision. Because the channels of STA2 and STA3 to the AP are aligned, the AP may still solve $s_1$ from STA1. In this method, STAs that choose the same $V_j$ would collide but this collision does not affect another STA that chooses a different $V_i$. Different STAs may use a common LTF sequence. Alternatively, STAs may randomly pick a LTF sequence such that if more than one STA chooses the same $V_j$, the AP may estimate a lower bound of the number of STAs involved in the collision.

Procedures may be used for low latency multi-link access. Enhancing low latency traffic performance is important in wireless communication systems. Multi-link transmissions have been considered as a potential solution to this problem. In the following example procedures, it may be assumed that an AP or non-AP STA may be able to operate on multiple links concurrently, and the AP or non-AP STA may be able to acquire one or more links. Link may be used interchangeably with channel and/or (frequency) band.

In an example, network link load measurements may be performed. With multi-link operations, a STA/AP may need to know the link load condition, and then select one or more links on which to transmit. The link load condition may indicate the volume of existing traffic and/or expected traffic on the link. Ay of the following example measurements approaches may be used to indicate the link load condition.

An example measurement method may be based on the usage ratio of UORA (e.g., in 802.11ax). A UORA procedure may enable an AP to assign resources for STAs with UL traffic and/or STAs that request to randomly access the media. The resources assigned by an AP may or may not be used by STAs. The usage ratio of the UORA procedure may be defined as an average ratio of used resources over assigned resources during a given time interval. For example, an AP may assign N RUs over time duration T. The AP may check the usage of the assigned RUs, such that M RUs may be used, M≤N. In this example, the usage ratio over the time period T is M/N. The AP may collect usage ratio statistics over K time periods and an average value may be used as the usage ratio. In an example, an average of the usage ratio over a sliding window may be used. In an example, a weighted average of the usage ratio over multiple time periods may be used (e.g., the most recent time period may be assigned a larger weight than earlier time periods).

Another example measurement method may be based on the collision ratio of UORA (e.g., in 802.11ax). A UORA procedure may enable an AP to assign resources for STAs with UL traffic and/or STAs that request to randomly access the media. The resources assigned by an AP may or may not be used by STAs. More than one STA may select to use the same resource unit(s) to transmit, resulting in collision. The AP may detect the collision (e.g., by the AP detecting that the energy level on the resource unit is above a predefine/predetermined threshold), and/or the AP may fail to detect the frame on the resource unit. The collision ratio of the UORA procedure may be defined as the average ratio of collided resources over assigned resources during a given time interval. For example, an AP may assign N RUs over time T. The AP may determine M RUs may be collided, M≤N. Nin this case, the collision ratio over the time period T may be M/N. The AP may collect the ratio over K time periods and an average value may be used as the collision ratio. In an example, an average over a sliding window may be used. In another example, a weighted average may be used (e.g., the latest time period may be assigned a larger weight than earlier time periods).

Another example measurement method may be based on the ratio of spatial reuse group (SRG) PPDU. SRG may be used to allow spatial reuse transmissions in a densely deployed system. The ratio of SRG PPDU may be defined as an average ratio between the number of SRG PPDUs and the non-SRG PPDUs. For example, an AP (or non-AP STA) may observe M non-SRG PPDUs and N SRG PPDUs over time T. The ratio over this interval may be defined as M/N. The device may collect the ratio over K time periods and an average value may be used as the usage ratio. In an example, an average over a sliding window may be used. In another example, a weighted average may be used. A bigger ratio may indicate that the network is busier (e.g., has more traffic). In an example, the latest time slot may be assigned a larger weight. In an another example, a normalized difference between the number of non-SRG PPDU and SRG PPDU may be used. For example, an AP (or non-AP STA) may observe M non-SRG PPDUs and N SRG PPDUs over time T. The normalized difference may be defined as $$\frac{N-M}{T}.$$

A smaller normalized difference may indicate the network is busier. The parameter may be further normalized by the ratio of SRG capable STAs in the BSS.

Another example measurement method may be based on the number of truncated TXOPs. A TXOP may be truncated by sending a contention-free end (CF-END) frame when the TXOP may not fully be used. The number of truncated TXOPs over a fixed length time period may indicate if the channel/link is fully loaded. For example, a larger number of truncated TXOPs may indicate that the channel (link) is not very busy (e.g., does not have a lot of traffic).

Another example measurement method may be based on the queue occupancy. Measurement based on queue occupancy may be over a fixed time period and/or per access category (AC). A device may maintain a queue for an AC in a channel/link. In an example, over time T, a device may check the maximum/average length of its queues over four ACs, as N1, N2, N3, N4. Then the queue occupancy for the four ACs may be N1/T, N2/T, N3/T, N4/T. Although four ACs are given as an example, any number of ACs may similarly be used.

Based on one or more network link load measurements, one or more links may be selected for certain transmissions or transmissions with certain requirements, e.g., low latency transmissions. Some measurements may be exchanged between AP and STAs. AP may include and/or request the collected or processed measurement(s) in a beacon frame or other management/control frame in the corresponding link and/or all the links. STAs may include and/or request the collected or processed measurement(s) in a management/control frame or aggregated with uplink data frame in the corresponding link and/or all the links.

According to an example link selection procedure, on one or more links, an AP may request the STAs to measure one or more link load measurements. The AP may send a link measurement request field/element/frame, which may be carried in a management frame such as beacon frame, probe response frame, or a control frame. The AP may indicate the requested measurements and corresponding parameters and/or links on which the measurements are suggested to be performed. For example, the AP may request a queue occupancy measurement on link 1, 2 and 3. The AP may indicate relevant measurement parameters such as the time duration T, the maximum queue size or average queue size, and/or the ACs request. In an example, one or a set of link load measurement may be predefined, and all the STAs may need to measure them. The transmission of the request for measurement may be omitted.

The AP may request the STAs to report the measurements by sending a link measurement report request field/element/frame, which may be carried in a management frame such as beacon frame, probe response frame, or a control frame on one or more links. The AP may indicate the requested measurements, links and corresponding parameters. For example, the AP may transmit the request on link 1 and ask for measurements on links 1,2,3. A STA that receives the measurement report request may send the report to the AP. In an example, the report may be included in a MAC header (e.g., in a HE-control field). In this case, a link/channel selection/adaptation fields may be defined in HE-control field, which may be included in the MAC header, so that the STA may transmit the measurement together with data field or other type of control field. In an example, a link load measurement report frame may be defined. The STA may transmit the frame independently or aggregated with other frames. The transmission of the report may be on one or more links. For example, the STA may transmit the report on link 1, which may include measurements for links 1, 2, 3.

The AP may collect enough information from STAs. The AP may process the collected link load measurement and determine or update a link load indicator. The AP may include the updated link load indicator in the beacon frame. In an example, the AP may include link the load indicator of link/channel 1 in beacon frame transmitted on link/channel 2. In an example, the AP may include link load indicator of all the operating links/channels in beacon frames transmitted on one link/channel. The AP may further select one or more links/channels for certain types of transmissions in the beacon interval. For example, the AP may select two links/channels with least traffic for low latency transmission. The AP may announce the selected links in a beacon frame.

One or more links/channels may be selected for low latency transmission. In an example, low latency traffics may form a low latency (LL) queue, which may be put in all the selected links/channels. The first frame in the queue may be transmitted over a first available link/channel. The second frame in the queue may be transmitted over a second available link/channel, and so on. Frames in the queue may be transmitted over different links/channels. A low latency frame may be put into the LL queue in all the selected links/channels, so that the frame may have a better chance to access at least one link/channel. A low latency frame may be transmitted repeatedly over multiple links. Procedures given below may be used to control the repeated transmissions.

An example low latency transmission procedure over multiple links may include repeated low latency multi-link transmissions. For example, a STA, AP STA or non-AP STA, may form a LL queue with low latency traffic. The STA may put the queue in one or more selected links/channels. The queue may carry the same LL frames over multiple links. Multiple links may share the low latency queue. In each link, the STA may perform CSMA/CA with back off for each queue using the queue related enhanced distributed channel access (EDCA) parameters. If the link is available for LL queue transmission, a frame in the LL queue may be transmitted. The frame may remain in the LL queue in the rest of the links unless a positive acknowledgement for the frame may be received in at least one link or the frame may be dropped since it may not be successfully delivered within a given time period. Thus, the frame may be transmitted multiple times over multiple links before a positive acknowledgement is received. The repeated transmission may provide higher reliability for the frame. Therefore, the link selection and queue formation may also be based on a reliability requirement. For example, the LL queue may be a low latency and high reliability traffic queue.

Another example low latency transmission procedure over multiple links may include NAK triggered low latency multi-link transmission. For example, a STA, AP STA or non-AP STA, may form LL queues with low latency traffic over multiple selected links/channels. The queue may carry the different LL frames over multiple links. A frame in one LL queue in link 1 may be transmitted over link 1 without positive acknowledgement. The frame may be copied and added to queues for other link(s). thus increasing the opportunity for the frame to be retransmitted over other link(s). In an example, the frame that failed in one link may be added to the beginning (front) of an LL queue(s) in other link(s). Thus, the failed frame has a chance to be transmitted on the other link first.

In the example low latency transmission procedures described above, a frame may have chance to be transmitted over multiple links. The modulation and coding scheme used in different links may be different. The transmission schemes, such as beamforming, MIMO, may be different in different links. HARQ combine may be performed to enable more reliable transmissions. Thus, HARQ related parameters (e.g., HARQ ID, HARQ process ID, other HARQ related parameters) may be used to indicate that transmissions over multiple links may carry the same frame.

Procedures may be used for EDCA parameter adjustment. EDCA parameters may be modified on one or more links based on one or more network link load measurements (e.g., contention window minimum (CWmin), contention window maximum (CWmax), arbitration interframe space (AIFS), TXOP limits). Some measurements may be exchanged between an AP and STAs. An AP may include the collected or processed measurement(s) in a beacon frame in the corresponding link and/or all the links. An AP may include the EDCA parameter set element for the link k in a beacon frame transmitted on link k. In an example, the AP may include the EDCA parameter set element for all the links in beacon frames transmitted on a link.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA) comprising:
 a receiver configured to receive, from an access point (AP), a trigger frame triggering random access using orthogonal frequency division multiple access (OFDMA), wherein the trigger frame includes a request for the STA to use a signal (SIG) field with user specific control information;
 a transmitter configured to transmit, to the AP, in response to the trigger frame a trigger-based frame including user specific control information in a signal (SIG) field, wherein the SIG field is transmitted using a partial resource unit (RU), and wherein the user specific control information includes a STA identifier (ID) and a traffic type; and
 the receiver configured to receive a negative acknowledgment (NAK) message indicating that the trigger-based frame was not successfully detected at the AP.

2. The STA of claim 1, wherein the trigger-based frame is a trigger-based Physical Layer Convergence Procedure (PLCP) Protocol Data Unit (TB-PPDU).

3. The STA of claim 1, wherein the SIG field is a SIG-B field.

4. The STA of claim 1, wherein the user specific control information further includes at least one of traffic load information, traffic latency information, or traffic quality of service (QoS) information.

5. The STA of claim 1, wherein the transmitter is configured to transmit the trigger-based frame as part of an uplink (UL) multi-user (MU) transmission.

6. The STA of claim 1, wherein the transmitter is configured to transmit the SIG field using a narrowband portion of a bandwidth, and to transmit at least one field of the trigger-based frame, other than the SIG field, using the entire bandwidth.

7. The STA of claim 1, wherein:
 the receiver is further configured to receive, from the AP, a scheduling retransmission frame including rescheduling information for at least one STA with a collided UL transmission and an indication that a collision of the trigger-based frame was detected; and
 the transmitter is further configured to retransmit the trigger-based frame.

8. The STA of claim 1, configured as a non-AP station (STA).

9. A method performed by a station (STA), the method comprising:
 receiving, from an access point (AP), a trigger frame triggering random access using orthogonal frequency division multiple access (OFDMA), wherein the trigger frame includes a request for the STA to use a signal (SIG) field with user specific control information;
 transmitting, to the AP, in response to the trigger frame a trigger-based frame including user specific control information in a signal (SIG) field, wherein the SIG field is transmitted using a partial resource unit (RU), and wherein the user specific control information includes a STA identifier (ID) and a traffic type; and
 receiving a negative acknowledgment (NAK) message indicating that the trigger-based frame was not successfully detected at the AP.

10. The method of claim 9, wherein the trigger-based frame is a trigger-based Physical Layer Convergence Procedure (PLCP) Protocol Data Unit (TB-PPDU).

11. The method of claim 9, wherein the SIG field is a SIG-B field.

12. The method of claim 9, wherein the user specific control information further includes at least one of traffic load information, traffic latency information, or traffic quality of service (QoS) information.

13. The method of claim 9, wherein the trigger-based frame is transmitted as part of an uplink (UL) multi-user (MU) transmission.

14. The method of claim 9, wherein the SIG field is transmitted using a narrowband portion of a bandwidth, and at least one field of the trigger-based frame, other than the SIG field, is transmitted using the entire bandwidth.

15. The method of claim 9, further comprising:
 receiving, from the AP, a scheduling retransmission frame including rescheduling information for at least one STA with a collided UL transmission and an indication that a collision of the trigger-based frame was detected; and
 retransmitting the trigger-based frame.

16. The method of claim 9 wherein the STA is configured as a non-AP station (STA).

* * * * *